US007353113B2

(12) United States Patent
Sprague et al.

(10) Patent No.: US 7,353,113 B2
(45) Date of Patent: Apr. 1, 2008

(54) SYSTEM, METHOD AND COMPUTER PROGRAM PRODUCT FOR AQUATIC ENVIRONMENT ASSESSMENT

(76) Inventors: Michael C. Sprague, P.O. Box 1840, Livingston, MT (US) 59047; Sarah G. Hughes, P.O. Box 974, Livingston, MT (US) 59047; William Procunier, P.O. Box 7260, Bozeman, MT (US) 59771-7260

(*) Notice: Subject to any disclaimer, the term of this patent is extended or adjusted under 35 U.S.C. 154(b) by 40 days.

(21) Appl. No.: 11/005,393

(22) Filed: Dec. 7, 2004

(65) Prior Publication Data

US 2006/0122794 A1 Jun. 8, 2006

(51) Int. Cl.
*G01V 3/00* (2006.01)
*E02B 11/00* (2006.01)
*G06G 7/48* (2006.01)

(52) U.S. Cl. ................... 702/2; 405/36; 703/9

(58) Field of Classification Search ............ 702/2, 702/3; 340/601; 405/36, 129.1, 128.1; 703/1, 703/9
See application file for complete search history.

(56) References Cited

U.S. PATENT DOCUMENTS

| | | | | |
|---|---|---|---|---|
| 5,757,665 A | * | 5/1998 | Nestler et al. | 702/45 |
| 5,916,801 A | * | 6/1999 | LoPinto et al. | 435/287.1 |
| 6,199,173 B1 | * | 3/2001 | Johnson et al. | 714/4 |
| 6,604,023 B1 | * | 8/2003 | Brown et al. | 700/276 |
| 6,746,177 B1 | * | 6/2004 | Hoashi | 405/15 |
| 6,889,141 B2 | * | 5/2005 | Li et al. | 702/2 |
| 7,142,196 B1 | * | 11/2006 | Connor et al. | 345/173 |
| 2005/0091009 A1 | * | 4/2005 | Belcher et al. | 703/1 |

OTHER PUBLICATIONS

Almy, R., Water Quality Analysis Report, Dec. 2003, Project Clean Water.*
Somerville et al., Physical Stream Assessment, Sep. 2004, US Army Corps of Engineers.*
Kamp et al., Assessment of River Habitat in Brandenburg, Germany, Oct. 2004, Limnologica- Ecology and Management of Inland Waters, vol. 34, Issue 3, pp. 176-186.*
USDA—Natural Resources Conservation Service. Stream Visual Assessment Protocol, NWCC-TN-99-1, 1998,pp. 1-36, National Weather and Climate Center, Portland, Oregon.
USDA—Natural Resources Conservation Service, Stream Corridor Restoration: Principles, Processes, and Practices, 2001, Chapter 3, Table 3.3. Potential Effects of major land use activities, 2001, pp. 3.27-3.28.

* cited by examiner

*Primary Examiner*—John E. Barlow, Jr.
*Assistant Examiner*—Toan M. Le
(74) *Attorney, Agent, or Firm*—Robert M. Hunter

(57) ABSTRACT

A system, method and computer program product are provided for assessing aquatic environments. Initially, the user measures biological, geomorphological and physiological parameters, quantitatively, semi-quantitatively and qualitatively in the field, guided by the computer software of the present invention, and enters the data obtained from such measurements entered into a handheld computer processing means running the computer software of the present invention. Then, the data is transferred into a desktop computer processing means for automated analysis, processing, reporting of field data, and production of various user reports through the synchronized, compatible desktop software of the present invention.

24 Claims, 3 Drawing Sheets

SYSTEM, METHOD AND COMPUTER PROGRAM PRODUCT FOR AQUATIC ENVIRONMENT ASSESSMENT

FIELD OF THE INVENTION

A system, method and computer program product are provided for assessing aquatic environments. Initially, biological, morphological and physiological parameters are measured quantitatively, semi-quantitatively and qualitatively. Then, the parameters are entered into the system for automated analysis, processing, reporting of field data, and production of various user reports through synchronized, compatible desktop software.

BACKGROUND OF THE INVENTION

A stream is a complex ecosystem in which numerous biological, physical, and chemical processes interact. Changes in any one characteristic or process have cascading effects throughout the system and result in changes to many aspects of the system. Often several factors can combine to cause profound changes. For example, increased nutrient loads alone might not cause a change to a forested stream. But, when combined with tree removal and channel widening, the result is to shift the energy dynamics from an aquatic biological community based on leaf litter inputs to one based on algae and macrophytes. The resulting chemical changes caused by algal photosynthesis and respiration and elevated temperatures may further contribute to a completely different biological community.

Many stream processes are in a delicate, dynamic balance. For example, stream power, sediment load, and channel roughness must balance. Hydrologic changes that increase stream power, if not balanced by greater channel complexity and roughness, result in "hungry" water that erodes banks or the stream bottom. Increases in sediment load beyond the transport capacity of the stream leads to deposition, lateral channel movement into stream banks, and channel widening.

Structural complexity may be provided by trees fallen into the channel, overhanging branches, roots extending into the flow, pools and riffles, overhanging vegetation, and a variety of bottom materials. Most systems would benefit from increased complexity and diversity in physical structure, as that complexity enhances habitat for organisms, as well as restores hydrologic properties that often are lost to physical, biological and/or chemical changes in the system.

For example, chemical pollution is a factor in many streams. The major categories of chemical pollutants are oxygen depleting substances such as manure, ammonia and organic wastes; the nutrients nitrogen and phosphorous; acids, such as those produced in mining and industrial activities; and toxic materials, such as pesticides, and salts or metals contained in some drain water. Increasing the complexity of the problem is the fact that the effects of many chemicals depend on several factors. For example, an increase in the pH caused by excessive algal and aquatic plant growth may cause an otherwise safe pre-existing concentration of phosphorous to become toxic. This result occurs due to the fact that the equilibrium concentrations of non-toxic ammonium ion and toxic unionized ammonia are pH-dependent.

Further, streams and flood plains need to operate as a connected system. Periodic flooding is generally necessary to maintain the flood plain biological community and to relieve the erosive force of flood discharges by reducing the velocity of the water. Flooding and bankfull flows are also essential for maintaining the instream physical structure. These flood events scour out pools, clean coarser substrates (such as gravel, cobbles, and boulders) of fine sediment, and redistribute woody debris.

Thus, it is an object of the present invention to provide a method, computer program product and system for assessing aquatic environments, by assessing various characteristics thereof, and producing a report of same containing recommendations for elimination and mitigation of detrimental changes, trends and characteristics in the aquatic environment, as well as recommendations for improvement of the aquatic environment so as to create an environment having a healthy biological, physical and chemical equilibrium.

It is a further object of the present invention to provide a method, computer program product and system for assessing aquatic environments, by assessing various characteristics thereof, and producing a water resource inventory report, i.e., a report of the quality and variety of streams or rivers within a watershed, whether and how they are used, misused, or threatened with misuse, or being altered by natural or human causes. This water resource inventory report can be used to evaluate and determine recommended actions for improvement of the aquatic environment so as to create an environment having a healthy biological, physical and chemical equilibrium.

It is a further object of the present invention to provide a method, computer program product and system for assessing an aquatic environment, by assessing various characteristics thereof, and producing a permit application report based on said assessment in which characteristics of the aquatic environment are compared to permit limitations and requirements, in which an evaluation is performed and report produced notifying a user as to whether certain the aquatic marine environment is in compliance with permits pertaining to same and, alternatively, whether proposed activities/ characteristics will affect compliance.

It is a further object of the present invention to provide a method, computer program product and system for assessing an aquatic environment, wherein various characteristics of the aquatic environment are assessed at an initial time, the various characteristics are then assessed at one or more later times, changes in the characteristics computed, and a trend monitoring report produced providing data as to what characteristics of the aquatic environment have and are changing over time, the possible causes there for, and possible actions to take in response to said changes.

It is yet a further object of the present invention to provide a method, computer program product and system for assessing an aquatic environment, wherein various characteristics and conditions of various regions of the aquatic environment are assessed, and a stream inventory report is produced, comparing conditions and characteristics of each assessed region. In addition, it is an object to provide said method, computer program product and system with the additional ability of producing a reference stream inventory report, wherein previous stream inventory report data may be accessed and compiled to produce a reference stream data report. The data therein may be used as a comparison against later stream inventory assessments.

SUMMARY OF THE INVENTION

The present inventors have earnestly endeavored to achieve the objects of the present invention, as described above, and as such provide, in a first embodiment of the present invention, a method for assessing an aquatic environment comprising:

(a) obtaining/measuring one or more site physicochemical parameters;

(b) assignment of numerical scores to each of the measured physicochemical parameters, and computation of an overall physicochemical parameter score, and average physicochemical parameter score, and a total number of physicochemical parameters measured, so as to determine a physicochemical parameter value;

(c) measurement of one or more aquatic environment health indicators;

(d) assignment of numerical scores to each of the measured aquatic environment health indicators, computation of an overall aquatic environment health indicator score, an average aquatic environment health indicator score, and a total number of parameters measured, so as to determine a stream health value;

(e) measurement of one or more morphological parameters;

(f) assignment of numerical scores to each of the measured morphological parameters, computation of an overall morphological parameter score, an average morphological parameter score, and a total number of morphological parameters measured, so as to determine a morphological parameter value;

(g) measurement of one or more disturbances affecting stream health comprising vegetative clearing, dams, levees, soil exposure or compaction, irrigation and drainage, channelization, contaminants, hard surfacing, overgrazing, roads and railroads, streambank armoring, trails, exotic species, utility crossings, reduction of floodplains, streambank disturbances, dredging for mineral extract, land grading, bridges, woody debris removal, withdrawal of water, and piped discharge containment outlets;

(h) assignment of numerical scores to each of the measured disturbances affecting stream health, computation of an overall disturbances affecting stream health score, computation of an average disturbances affecting stream health score, and computation of a total number of disturbances affecting stream health measured, so as to determine a disturbances affecting stream health value;

(i) production of one or more of a baseline stream assessment report, water resource inventorying report, permit application report, aquatic environment restoration report, aquatic and riparian habitat enhancement report, streambank stabilization report, post-treatment monitoring report, aquatic environment trend monitoring report, and stream inventory report, based on the physicochemical parameter value, stream health value, morphological parameter value, and disturbances affecting stream health value.

In a second embodiment of the present invention, a method for assessing an aquatic environment is provided according to the first embodiment herein, wherein the physicochemical parameters of step (a) comprises one or more of site location, site photographs, manure/human sewage presence, salinity, withdrawal of water from the aquatic environment, contaminants, trails, presence of dredging for mineral extracts, piped discharge/containment outlets, hard surfacing, land grading, soil exposure or compaction, utility crossings and bridges.

In a third embodiment of the present invention, the method for assessing an aquatic environment according to the first embodiment herein is provided, wherein the aquatic environment health indicators comprise one or more of channel condition, hydrologic alteration, riparian zone, bank stability, water appearance, nutrient enrichment, instream fish cover, barriers to fish movement, pools, canopy cover, manure presence, riffle embeddedness, and macroinvertebrates observed.

In a fourth embodiment of the present invention, the method for assessing an aquatic environment according to the first embodiment herein is provided, wherein the morphological parameters comprise one or more of dominant substrate, cross section data, flood prone area width, cross section elevation readings, channel configuration, water surface elevation, maximum depth elevation, bankfull elevation, derived flood plain width, longitudinal survey, stream velocity, pools, riffle embeddedness, channel condition, hydrologic alteration, bank stability, channelization, streambank armoring, streambank disturbances, presence of dams, presence of levees, presence of irrigation and drainage, presence of railroads and roads, and reduction of floodplains.

In a fifth embodiment of the present invention, the method for assessing an aquatic environment according to the first embodiment herein is provided, wherein disturbances affecting stream health comprise one or more of vegetative clearing, dams, levees, soil exposure or compaction, irrigation and drainage, channelization, contaminants, hard surfacing, overgrazing, roads and railroads, streambank armoring, trails, exotic species, utility crossings, reduction of floodplains, streambank disturbances, dredging for mineral extract, land grading, bridges, woody debris removal, withdrawal of water, and piped discharge containment outlets.

In a sixth embodiment of the present invention, the method for assessing an aquatic environment according to the first embodiment herein is provided, wherein production of the baseline stream assessment report comprises comparison of the measured physicochemical parameter value, stream health value, morphological parameter value, and disturbances affecting stream health value of the aquatic environment to the physicochemical parameter value, stream health value, morphological parameter value, and disturbances affecting stream health value of a reference stream, and computation of a aquatic environment relative health score based on said comparison.

In a seventh embodiment of the present invention, the method for assessing an aquatic environment according to the first embodiment herein is provided, wherein the water resource inventorying report comprises assessing all aquatic environments within a defined watershed according to the method of claim 1, and compilation of the measured physicochemical parameter values, stream health values, morphological parameter values, and disturbances affecting stream health values of each aquatic environment assessed to produce a user report of quality and variety of all aquatic environments with said defined watershed.

In an eighth embodiment of the present invention, the method of assessing an aquatic environment according to the first embodiment herein is provided, wherein the permit application report comprises a user report of all activities causing discharge, filling, or dredge material into the aquatic environment.

In a ninth embodiment of the present invention, the method of assessing an aquatic environment according to the eighth embodiment herein is provided, wherein production of the permit application report further comprises:

i. querying of a database containing permit rules, to compare activities causing discharge, filling, or dredge material into the aquatic environment with applicable permit rules concerning same, so as to determine compliance with one or more permits pertaining to the aquatic environment; and ii. production of a user permit compliance report based on said comparison in step (i).

In a tenth embodiment of the present invention, the method of assessing aquatic environments of the first embodiment herein is provided, wherein production of the aquatic environment restoration report comprises:

i. comparison of the measured physicochemical parameter values, stream health values, morphological parameter values, and disturbances affecting stream health values of the aquatic environment to corresponding reference stream values;

ii. querying of a database of restoration measures, based on said comparison in (i), to determine appropriate restoration measures to be undertaken; and iii. production of a user report comprising restoration measures to be taken in response to the physicochemical measurements, stream health measurement, morphological measurements and disturbances affecting stream health measurements of the aquatic environment.

In an eleventh embodiment of the present invention, the method for assessing aquatic environments of the first embodiment herein is provided, wherein production of the aquatic and riparian habitat enhancement report further comprises:

i. comparison of the measured physicochemical parameter values, stream health values, morphological parameter values, and disturbances affecting stream health values of the aquatic environment to corresponding reference stream values;

ii. querying of a database of aquatic and riparian habitat measures, based on said comparison in (i), to determine appropriate aquatic and riparian habitat measures to be undertaken; and iii. production of a user report comprising aquatic and riparian habitat measures to be taken in response to the physicochemical measurements, stream health measurement, morphological measurements and disturbances affecting stream health measurements of the aquatic environment.

In a twelfth embodiment of the present invention, the method for assessing aquatic environments of the tenth embodiment is provided, wherein aquatic and riparian habitat measures comprise one or more of steam bank biostabilization, and habitat design for natural self-sustaining systems within and adjacent to the aquatic environment.

In a thirteenth embodiment of the present invention, the method for assessing aquatic environments of the first embodiment herein is provided, wherein production of the streambank stabilization report, further comprising:

i. comparison of the measured physicochemical parameter values, stream health values, morphological parameter values, and disturbances affecting stream health values of the aquatic environment to corresponding reference stream values;

ii. querying of a database of streambank stabilization techniques, based on said comparison in (i), to determine appropriate streambank stabilization measures to be undertaken; and iii. production of a user report comprising streambank stabilization measures to be taken in response to the physicochemical measurements, stream health measurement, morphological measurements and disturbances affecting stream health measurements of the aquatic environment.

In a fourteenth embodiment of the present invention, the method for assessing aquatic environments of the thirteenth embodiment herein is provided, wherein streambank stabilization techniques comprise one or more of planting of riparian vegetation within and/or adjacent to the aquatic environment, building of barriers, and removal of hard armor.

In a fifteenth embodiment of the present invention, the method for assessing aquatic environments of the first embodiment herein is provided, wherein production of the post-treatment monitoring report further comprises:

(i) repeating steps (a)-(k) one or more times at one or more different time intervals;

(ii) querying of a database containing the physicochemical measurements, stream health measurement, morphological measurements and disturbances affecting stream health measurements of the aquatic environment measured in steps (a)-(k);

(iii) comparison of the data obtained in step (ii) with the physicochemical measurements, stream health measurement, morphological measurements and disturbances affecting stream health measurements of the aquatic environment measured in step (i); and (iv) production of a post-treatment monitoring report comprising results of comparisons of aquatic environment conditions over time.

In a sixteenth embodiment of the present invention, the method for assessing aquatic environments of the first embodiment herein is provided, wherein production of the aquatic environment trend monitoring report further comprises:

(i) repeating steps (a)-(k) one or more times at one or more different time intervals;

(ii) querying of a database containing the physicochemical measurements, stream health measurement, morphological measurements and disturbances affecting stream health measurements of the aquatic environment measured in steps (a)-(k);

(iii) comparison of the data obtained in step (ii) with the physicochemical measurements, stream health measurement, morphological measurements and disturbances affecting stream health measurements of the aquatic environment measured in step (i);

(iv) computation of trends in characteristics of the aquatic environment over time, based on the data obtained in steps (i)-(iii); and (v) production of an aquatic environment trend monitoring report comprising displays of the changes in characteristics of the aquatic environment conditions over time.

In a seventeenth embodiment of the present invention, the method for assessing aquatic environments of the sixteenth embodiment herein is provided, wherein production of the aquatic environment trend monitoring report further comprises:

(vi) querying of a database containing data concerning causation of aquatic environment characteristic trends;

(vii) querying of a database containing data concerning mitigation and restoration techniques; and (viii) production of an aquatic environment trend monitoring report comprising recommendations for mitigation and restoration in response to negative trends in the aquatic environment.

In an eighteenth embodiment of the present invention, a computer program embodied on a computer readable medium for use with a computer for enabling a user to output a user report of aquatic environment condition is provided, said computer program comprising:

computer readable code operable to enable input of aquatic environment conditions comprising one or more of comprising physical characteristic data, geographic location data, historical data, data concerning disturbances affecting stream health, biological data, morphological data and physicochemical data of the aquatic environment, so as to build a primary subject aquatic environment profile;

computer readable code operable to enable construction of a database comprising data concerning physical characteristic data, geographic location data, historical data, data concerning disturbances affecting stream health, biological data, morphological data and physicochemical data of a reference aquatic environment profile;

computer readable code operable to enable interaction with the database comprising physical characteristic data, geographic location data, historical data, data concerning disturbances affecting stream health, biological data, morphological data and physicochemical data of a reference aquatic environment profile;

computer readable program code operable to enable the user to select a type of query to be performed on said database;

computer readable program code operable to enable a user to select a desired user report;

computer readable program code operable to reference said database so as to compare the primary subject aquatic environment profile with the reference aquatic environment profile, and produce comparison data;

computer readable program code operable to enable input of the primary subject aquatic environment profile, the reference aquatic environment profile, and the comparison data into the desired user report; and computer readable program code operable to output the desired user report to the user.

In a nineteenth embodiment of the present invention, the computer program embodied on a computer readable medium for use with a computer for enabling a user to output a user report of aquatic environment condition of the eighteenth embodiment is provided, wherein the desired user report is a water resource inventory report, said computer program further comprising:

computer readable program code operable to reference said database so as to determine undesirable disturbances affecting stream health, undesirable biological conditions, undesirable morphological conditions and undesirable physicochemical conditions of the primary subject aquatic environment; and computer readable program code operable to reference said database to determine causation of the undesirable disturbances affecting stream health, the undesirable biological conditions, the undesirable morphological conditions and the undesirable physicochemical conditions of the primary subject aquatic environment.

In a twentieth embodiment of the present invention, the computer program embodied on a computer readable medium for use with a computer for enabling a user to output a user report of aquatic environment condition of the nineteenth embodiment is provided, further comprising:

computer readable program code operable to reference said database to determine possible remedial actions based on the causation of the undesirable disturbances affecting stream health, the undesirable biological conditions, the undesirable morphological conditions and the undesirable physicochemical conditions of the primary subject aquatic environment.

In a twenty first embodiment of the present invention, the computer program embodied on a computer readable medium for use with a computer for enabling a user to output a user report of aquatic environment condition of the eighteenth embodiment is provided, wherein the desired user report is a permit compliance report, said database further comprising permit compliance data, said computer program further comprising:

computer readable program code operable to reference said database to determine requirements for compliance with said permit; and computer readable program code operable to compare said primary subject aquatic environment profile to requirements for compliance.

In a twenty second embodiment of the present invention, the computer program embodied on a computer readable medium for use with a computer for enabling a user to output a user report of aquatic environment condition of the eighteenth embodiment is provided, wherein the desired user report is an aquatic environment restoration report, said computer program further comprising:

computer readable program code operable to reference said database so as to determine undesirable disturbances affecting stream health, undesirable biological conditions, undesirable morphological conditions and undesirable physicochemical conditions of the primary subject aquatic environment; and computer readable program code operable to reference said database to determine causation of the undesirable disturbances affecting stream health, the undesirable biological conditions, the undesirable morphological conditions and the undesirable physicochemical conditions of the primary subject aquatic environment.

In a twenty third embodiment of the present invention, the computer program embodied on a computer readable medium for use with a computer for enabling a user to output a user report of aquatic environment condition of the twenty second embodiment is provided, further comprising:

computer readable program code operable to reference said database to determine possible restorative actions based on the causation of the undesirable disturbances affecting stream health, the undesirable biological conditions, the undesirable morphological conditions and the undesirable physicochemical conditions of the primary subject aquatic environment.

In a twenty fourth embodiment, the computer program embodied on a computer readable medium for use with a computer for enabling a user to output a user report of aquatic environment condition of the eighteenth embodiment is provided, wherein the desired user report is an aquatic environment and riparian habitat enhancement report, said computer program further comprising:

computer readable program code operable to reference said database so as to determine possible aquatic environment and riparian habitat enhancement actions in response to the primary subject aquatic environment profile.

In a twenty fifth embodiment of the present invention, the computer program embodied on a computer readable medium for use with a computer for enabling a user to output a user report of aquatic environment condition of the eighteenth embodiment is provided, wherein the desired user report is a streambank stabilization report, said computer program further comprising:

computer readable program code operable to reference said database so as to determine possible vegetative and bioengineering techniques available to stabilize a streambank of the primary subject aquatic environment, based on the primary subject aquatic environment profile.

In a twenty sixth embodiment, the computer program embodied on a computer readable medium for use with a computer for enabling a user to output a user report of aquatic environment condition of the eighteenth embodiment is provided, wherein the desired user report is a post-treatment monitoring report, said computer program further comprising:

computer readable code operable to enable input of aquatic environment conditions comprising one or more of physical characteristic data, geographic location data, historical data, data concerning disturbances affecting stream health, biological data, morphological data and physicochemical data of the aquatic environment, so as to build one or more secondary subject aquatic environment profiles;

computer readable code operable to enable a user to compare the reference aquatic environment profile, the primary subject aquatic environment profile and one or more secondary subject aquatic environment profiles;

computer readable program code operable to enable determination of changes in conditions of the subject aquatic environment; and computer readable program code operable to enable causation of said changes in conditions of the subject aquatic environment.

In a twenty seventh embodiment, the computer program of the eighteenth embodiment is provided, further comprising:

computer readable program code operable to enable reference of the database to determine a base so as to compare one or more of the secondary subject aquatic environment profiles with the subject aquatic environment profile;

computer readable program code operable to produce comparison data comprising changes in the conditions of the subject aquatic environment over time;

computer readable program code operable to enable input of the physical characteristic data, the geographic location data, the historical data, the data concerning disturbances affecting stream health, the biological data, the morphological data, the physicochemical data and the comparison data into the desired user report; and computer readable program code operable to output the desired user report to the user.

In a twenty eighth embodiment of the present invention, the computer program embodied on a computer readable medium for use with a computer for enabling a user to output a user report of aquatic environment condition of the eighteenth embodiment is provided, wherein the desired user report is a trend monitoring report, said computer program further comprising:

computer readable code operable to enable input of aquatic environment conditions comprising one or more of physical characteristic data, geographic location data, historical data, data concerning disturbances affecting stream health, biological data, morphological data and physicochemical data of the aquatic environment, so as to build one or more secondary subject aquatic environment profiles;

computer readable code operable to enable a user to compare the reference aquatic environment profile, the primary subject aquatic environment profile and one or more secondary subject aquatic environment profiles;

computer readable program code operable to reference said database to determine changes in conditions of the subject aquatic environment over time;

In a twenty ninth embodiment of the present invention, the computer program of the twenty eighth embodiment is provided, further comprising:

computer readable program code operable to reference said database to determine causation of said changes in conditions of the subject aquatic environment over time; and computer readable program code operable to reference said database to determine effect of said changes in conditions on the subject aquatic environment.

In a thirtieth embodiment of the present invention, a system for assessing an aquatic environment is provided, including:

a first handheld computer processor means for inputting and processing data;

a geographical positioning means;

a base computer processor means;

a digital photographic means;

a storage means for storing a database of aquatic environment assessment method step data, physical characteristic data, geographic location data, historical data, data concerning disturbances affecting stream health, biological data, morphological data and physicochemical data of an aquatic environment and/or a riparian habitat, permit requirement data, aquatic environment restoration action data, and aquatic environment enhancement action;

a data input means;

a data display means;

a first means for enabling interaction with said database;

a second means for enabling input of one or more of aquatic environment assessment method step data, physical characteristic data, geographic location data, historical data, data concerning disturbances affecting stream health, biological data, morphological data and physicochemical data of an aquatic environment and/or a riparian habitat, permit requirement data, aquatic environment restoration action data, and aquatic environment enhancement action into said handheld computer processing means and/or said base computer processing means, so as to create a primary subject aquatic environment profile;

a third means operable to reference said database so as to retrieve aquatic environment assessment method step data, physical characteristic data, geographic location data, historical data, data concerning disturbances affecting stream health, biological data, morphological data and physicochemical data of an aquatic environment and/or a riparian habitat, permit requirement data, aquatic environment restoration action data, and aquatic environment enhancement action;

a fourth means operable to enable a user to select a desired user report; and a fifth means operable to output the desired user.

In a thirty first embodiment of the present invention, the system of the thirtieth embodiment is provided, further comprising:

a sixth means for enabling interaction of said handheld computer processing means with said base computer processor means.

In a thirty second embodiment of the present invention, the system of the thirtieth embodiment is provided, further comprising an eighth means operable to enable importation of a reference aquatic environment profile.

In a thirty third embodiment of the present invention, a method for assessing a river or stream is provided comprising:

(a) recording site observation data, said site observation comprising property name, evaluator name, river or stream name, site location, and site photo, and storing said data in a handheld computer processor means;

(b) conducting a visual assessment protocol of the river or stream comprising obtaining/measuring one or more visual assessment parameters selected from the group consisting of channel condition, hydrologic alteration, riparian zone, bank stability, water appearance, nutrient enrichment, instream fish cover, barriers to fish movement, pools, canopy cover, manure presence, riffle embeddedness, and macroinvertebrates observed, recording said visual assessment parameters by assigning each parameter a numerical score based on protocol guidelines, and inputting said numerical scores in the handheld computer processor means;

(c) computation of an overall visual assessment protocol score, an average visual assessment protocol score, and a total number of visual assessment parameters measured, so as to determine a visual assessment protocol value;

(d) measurement of one or more aquatic environment health indicators, recording said aquatic health environment indicators by assigning each indicator a numerical score, based on method guidelines, and inputting said numerical scores in the handheld computer processor means;

(e) computation of an overall aquatic environment health indicator score, an average aquatic environment health indicator score, and a total number of parameters measured, so as to determine a stream health value;

(f) measurement of one or more morphological parameters of the river or stream selected from group consisting of dominant substrate, cross section data, flood prone area width, cross section elevation readings, channel configuration, water surface elevation, maximum depth elevation, bankfull elevation, derived flood plain width, longitudinal survey, stream velocity, pools, riffle embeddedness, channel condition, hydrologic alteration, bank stability, channelization, streambank armoring, streambank disturbances, presence of dams, presence of levees, presence of irrigation and drainage, presence of railroads and roads, and reduction of floodplains, by assigning each morphological parameter a numerical score, based on method guidelines, and inputting said numerical scores in the handheld computer processor means;

(g) computation of an overall morphological parameter score, an average morphological parameter score, and a total number of morphological parameters measured, so as to determine a morphological parameter value;

(h) measurement of one or more disturbances affecting stream health comprising vegetative clearing, dams, levees, soil exposure or compaction, irrigation and drainage, channelization, contaminants, hard surfacing, overgrazing, roads and railroads, streambank armoring, trails, exotic species, utility crossings, reduction of floodplains, streambank disturbances, dredging for mineral extract, land grading, bridges, woody debris removal, withdrawal of water, and piped discharge containment outlets, by assigning each measure disturbance affecting stream health a numerical score, based on method guidelines, and inputting said numerical scores in the handheld computer processor means; and (i) computation of an overall disturbances affecting stream health score, computation of an average disturbances affecting stream health score, and computation of a total number of disturbances affecting stream health measured, so as to determine a disturbances affecting stream health value.

In a thirty fourth embodiment of the present invention, the method of the thirty third embodiment is provided, further comprising the steps of:

(j) transfer of data measured and computed in steps (a)-O from the handheld computer processor means to a base computer processor means;

(j) processing of said transferred data by the base computer processor means to produce one or more of a baseline stream assessment report, water resource inventorying report, permit application report, aquatic environment restoration report, aquatic and riparian habitat enhancement report, streambank stabilization report, post-treatment monitoring report, aquatic environment trend monitoring report, and stream inventory report.

In a thirty fifth embodiment of the present invention, the method of the thirty fourth embodiment is provided, wherein said processing comprises generation of a GIS mapping based on the site location data.

In a thirty sixth embodiment of the present invention, the method of the thirty fourth embodiment is provided, wherein said processing comprises graphing of river or stream cross section.

In a thirty seventh embodiment of the present invention, the method of the thirty fourth embodiment is provided, wherein said processing comprises analysis of disturbances affecting stream health to determine likely cumulative effects.

In a thirty eighth embodiment of the present invention, a computer program embodied on a computer readable medium for use with a computer for enabling a user to calculate a Rosgen Stream Classification of a river or stream is provided comprising:

computer readable code operable to enable construction of a database comprising Rosgen Stream Classification guidelines;

computer readable code operable to enable input of entrenchment data, width/depth data, elevation data, and single or multiple thread channel existence data for two or more reaches of the stream or river, so as to build a primary subject aquatic environment profile;

computer readable code operable to enable calculation of entrenchment ratio, width/depth ratio, slope and sinuosity, based on the primary subject aquatic environment profile;

computer readable program code operable to enable the user to request a comparison of the primary subject aquatic environment profile and/or entrenchment ratio, width/depth ration, slope and sinuosity to the Rosgen Stream Classification guidelines on said database, so as to calculate a Rosgen Stream Classification of the river or stream; and computer readable program code operable to output the desired user report to the user.

DETAILED DESCRIPTION OF THE INVENTION

Figure 1:
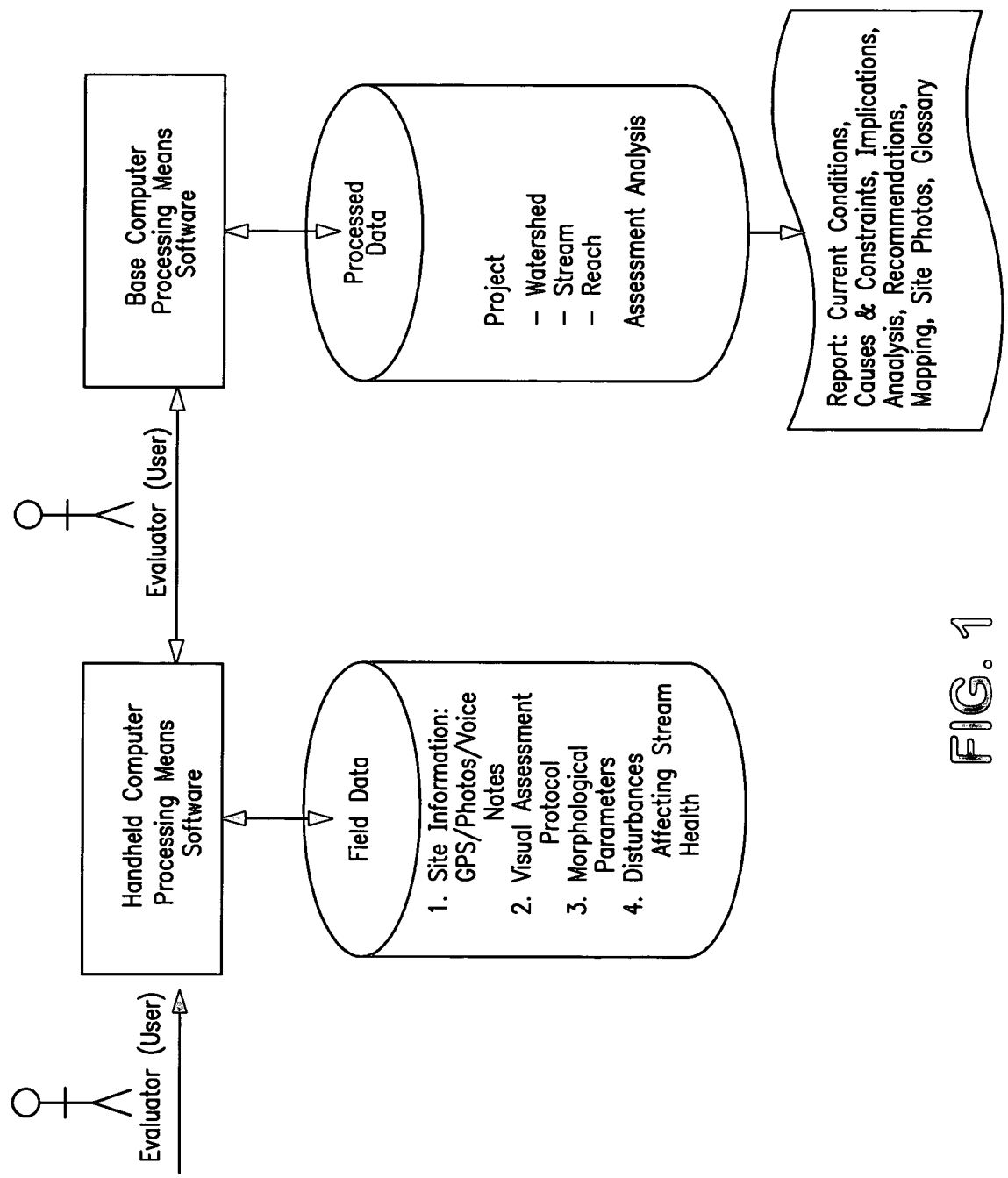
FIG. 1 is a box diagram illustrating the general steps take in the method of the present invention, and by the computer program and system of the present invention.
Figure 2:
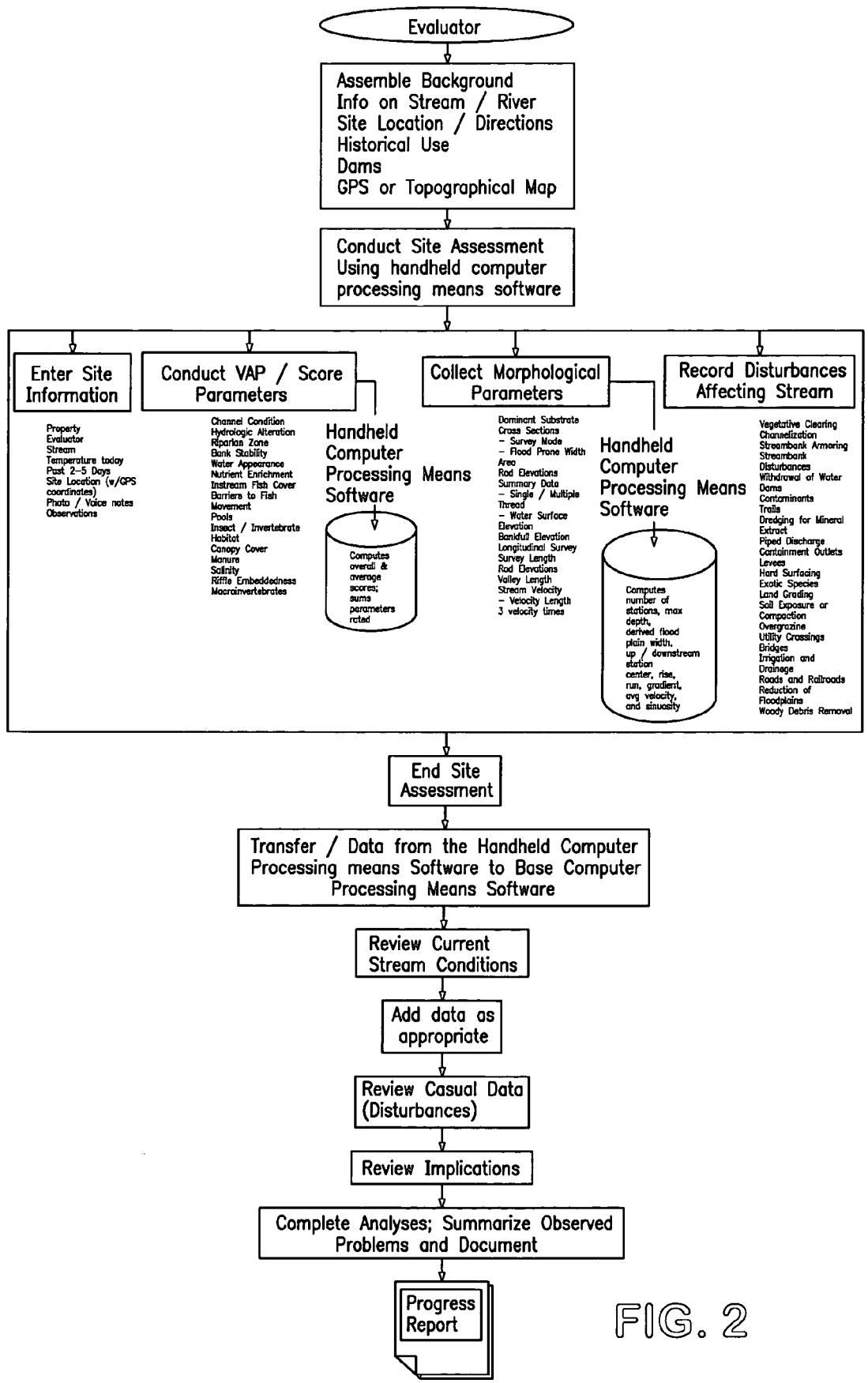
FIG. 2 is a flowchart illustrating the detailed steps taken in the method of the present invention, and by the computer program and system of the present invention.

The method, computer software program and system of the present invention merges a stream assessment protocol with computer software (a handheld computer processing means and a base computer processing means, computer hardware (hand-held computer, a global positioning system (GPS) device, and digital camera), and field equipment toolkit to collect and analyze data for the purpose of conducting rapid and accurate riverine environmental and ecological assessments within a watershed. It is used for baseline stream assessments, water resource inventories, permit application requirements, river restoration, aquatic and riparian habitat enhancement, permitting, streambank stabilization, post-treatment monitoring, and trend monitoring by, for example, engineers, hydrologists, wetland specialists, geomorphologists, contractors, developers, landscapers, landscape architects working within private industry, governments, universities and not-for-profits.

The field component of the present inventions' software is installed to a hand-held field unit device (a handheld computer processing means), such as the TDS Recon 400, running the Windows Mobile 2003 operating system. The software is written in SuperWaba, a Java-like language. As such it can run on a wide variety of platforms, including Palm OS. The minimum requirements for the pocket PC platform are as follows:

| Processor speed: | 400 MHz Intel PXA255 XScale Processor |
| --- | --- |
| Memory: | 64 MB high-speed SDRAM |
| Storage: | 128 MB nonvolatile Flash storage |
| Display: | 320 × 240 16 bit color |

The present invention's software also includes a component to be installed on an office desktop computer (a base computer processing means) such as a PC. The base software is written in the Java language and can run on a wide variety of platforms. The minimum requirements for a Microsoft Windows-based computer are as follows:

| Processor: | Pentium 166 MHz |
| --- | --- |
| Memory: | 256 MB or more |
| Operating System: | 32 bit Windows such as Windows XP or 2000 Professional |

In addition, the following hardware components constitute elements of the system of the present invention:

a. Digital camera: for example, 1.3 megapixel CF card camera.

b. A waterproof cap fitting over the CF camera: for example, a TDS optical cap.

c. A Bluetooth wireless GPS receiver, such as a Delorme Earthmate Blue Logger.

d. A Bluetooth wireless CF card

For example, in a most preferred embodiment of the system of the present invention, the Recon mentioned above is the hand-held computer which runs the computer software of the present invention. The FlyCam fits into a CF slot on the top of the Recon and is protected by a waterproof optical cap. The wireless GPS receiver communicates with the Recon via a Bluetooth card, inserted in the second CF slot on the top of the Recon and also protected from water and weather by the optical cap.

The handheld computer processing means software of the present invention integrates the digital camera, GPS, and Recon, allowing the analyst to capture observations in the field. An 'observation' comprises a time/date stamp, a position, a photograph, and notes (either text or voice). If the analyst takes a photo with the handheld computer processing means software of the present invention, the time/date and position are automatically recorded. If/when TDS integrates Bluetooth into the Recon, the Bluetooth card will not be needed. If/when a camera card is developed with integrated GPS receiver, the separate GPS receiver will not be needed.

The combination handheld computer/GPS/digital camera field unit integrated for use with the computer software of the present invention installed on the handheld computer processing means, as mentioned above, may be synchronized with compatible desktop software of the present invention installed on a desktop or laptop computer for data download from, or upload to, the handheld field unit. Measurement of the physicochemical, biological and morphological characteristics of a stream or river, from existing data and field data, may be performed to assess the condition/health/function of that stream or river along a particular reach or within a particular watershed at a particular point in time, in order to mitigate disturbance, and/or design restoration, enhancement or mitigation treatments, monitor trends in condition/health/function and/or monitor the effects of any restoration, enhancement or mitigation activities.

In an embodiment of the system of the present invention related to the above preferred embodiment, a water quality monitoring module to assess parameters such as pH, total alkalinity, dissolved oxygen, specific conductivity, nitrates, total dissolved solids, total suspended solids, contaminants (PCBs, heavy metals, cyanide) may be provided with, or in combination with, the handheld computer processing means.

In another embodiment of the system of the present invention related to the above preferred embodiment, computer readable code operable to enable inclusions of fields to accept more detailed water quality data, as well as, optionally, a multi-purpose probe for recording various water quality parameters.

In another embodiment of the system of the present invention, computer readable code operable to function as a stream inventory module may be provided, automating the sort/compare function for specific parameters to quickly categorize streams or prioritize for restoration.

In yet another embodiment of the present invention, computer readable operable code may be provided to enable input into the database of an Index of Biological Integrity (IBI) for macroinvertebrates, fish, or a specific species of concern which would involve associated statistical analysis.

In another embodiment of the present invention, computer readable code operable to enable input into the database digital maps, either topographical or digital orthophoto quads (DOQQs), for in-field navigation and/or for automated inclusion into data analysis and reporting, may be provided.

In another embodiment of the present invention, computer readable code operable operable to create automatic GIS-compatible shapefiles of location data input by the user may be provided.

With regards to the database of the present invention, for example, the base computer processing means uses, generally, an SQL database for data storage and management. Interaction with the database is through standard SQL. The DBMS for the present invention is MySQL, but other DBMS's may be utilized.

The handheld computer processing means software enables the evaluator to collect data for one or more assessments of a reach of a river or stream within a watershed. For example, the handheld computer processor means software guides the user by provided detailed information on a display means of the handheld computing means on how to score each stream health indicator, morphological parameter, disturbance affecting stream health, etc.

Further, the handheld computer processing means software computes several quantitative measurements and enables automatic association of recorded (visual and voice) observations with stream conditions. Observations consist of time/date stamp, a position (GPS reading), photo, and, optionally, text/voice notes. The field data collected for one or more assessment of a reach of a river or stream may then be transferred to the appropriate project within the a database in connection with the base computer processing means and software, where they may be associated with watershed and stream data.

The handheld computer processing means software can communicate with the base computer processor means software via cable, or via a TCP socket connection, established over USB and/or Bluetooth media utilizing Microsoft's ActiveSync software to provide the IP network infrastructure, and software protocol developed by the present inventors.

The computer software program application of the present invention provides for data collected in the field, obtained from maps, from the landowner, historical records, and other sources to be entered into a handheld computer processing means on site. The application assists in the compilation and presentation of the data in a useable form. The analyst may interpret the data to make general recommendations for desired conditions that would enhance or restore the stream.

For example, if a stream has a the proposed riprap project (for bank stabilization) is assessed using the computer software program of the present invention before the permit is granted, the analyst could recommend an alternative stabilization method (such as planting willows instead of hard riprap) than that requested in the permit (riprap) to achieve bank stabilization.

However, if the riprap were permitted and implemented, but at a later date, the stream was re-assessed using the computer software program of the present invention, and it was determined that the riprap had an adverse impact or failed to stabilize the streambank, then it would be possible to show that the recommendations for alternatives proposed in the report generated by the computer software program of the present invention could be followed to achieve the desired outcome (streambank stabilization).

Most of the analysis and processing performed by the base computer processing means is automatic; however, the evaluator can refine, revise and add to the data. The evaluator can also input additional information/data not collected in the field. The evaluator may then request the base computer processing means software to determine the Rosgen Stream Classification of the riverine environment studied. In addition, the base computer processing means software displays cross section data, calculates statistics such as the average water depth, graphs the stream cross section, displays the Stream Health Indicators and Disturbances, and performs a Cumulative Effects analysis.

The evaluator enters the desired stream conditions into the base computer processing means software, and the software prepares a Gap Analysis, which informs the evaluator of the differences between the desired conditions and the existing conditions. The evaluator reviews the data and enters recommendations. The evaluator also enters appropriate observations to incorporate into the report. The base computer processing means software generates a comprehensive, printable report to document the data analysis and recommendations for further action based on that analysis.

The method, software and system of the present invention is targeted to meet the needs of experienced professionals and resource technicians assisting property owners and land managers for stream and river assessment, land-use management, and restoration and enhancement activities, especially targeted for riverine fisheries and the riparian and ecological systems upon which they depend.

The handheld computer processing means software unit contains four basic sections of the protocol for field assessment of a stream/river: (1) Site Information, (2) Stream Health Indicators, (3) Substrate, Cross Section, Longitudinal Profile, Velocity, and (4) Disturbances. The units have the following functionalities:

1. Site Information

The evaluator uses this page to record basic site information about the assessment reach (that stream segment of interest). The reach boundaries can be based on ecological, erosional, or property length considerations, but the reach is representative of the stream's characteristics).

Assessment Name

The evaluator enters the name of the assessment. This, along with the time/date stamp, is used to identify the assessment.

Technician

The name of the technician conducting the assessment.

Stream

The stream's name.

Today's Temp

Average afternoon temperature.

Recent Temp

Average afternoon temperature, past 2-5 days.

Water Temp

Today's temperature at 60% maximum depth.

Site Observations

The evaluator takes a landscape photo of the stream reach to use as a general reference picture. Facing downstream, takes a second photo of the upper boundary and a third of the lower boundary. Photos are automatically assigned to time/date stamp and location coordinates.

2. Stream Health Indicators

There are fifteen parameters in the Stream Health Indicators. The evaluator examines the stream assessment reach for each of the parameters, assigns a score of 1-10 to each one (except macroinvertebrates, which can be scored −3 to 15), and records the score in the handheld computer processing means software stored on the handheld computer processing means. Parameters that are not applicable are assigned N/A. The handheld computer processing means software automatically computes an overall and average score, and tallies the number of parameters rated. The handheld computer processing means software displays scoring information and definitions in an online help format, to assist the evaluator in conducting the assessment. The evaluator may record an observation of any indicator.

Channel Condition
  Scoring:
10=natural channel
7=past channelization, but signs of recovery with dikes or levies set back, providing stream access to flood plain.
3=altered channel; <50% riprapped/channeled reach; excess aggradation; levees/dikes restrict stream access to flood plain.
1=active downcutting or widening of channel; >50% riprapped/channeled reach; levees/dikes stop stream from accessing flood plain.
  Note:
  Unnatural stream conditions with structures, riprap, and dikes cause channelization, downcutting, and bank erosion and lead to unstable stream channel conditions. Walk the entire reach to see if there is any sign of channelization.

Definitions:

Structures (dikes, berms, check dams, irrigation diversions, culverts, bridge abutments, and riprap, i.e., structures placed on the bank to deflect the stream's energy) that cause the stream to straighten (channelization). Signs of channelization include high banks with little or no vegetation, dikes, berms, no diversity in rate of flow, uniform-sized cobbles or substrate, bank erosion (eaten away), and unnaturally straight sections of the stream). Downcutting occurs when the stream—because it can not get rid of its energy naturally via meanders, bends, and full access to the flood plain—digs down or incises the banks. Incision can be seen by a lack of sediment depositional features (e.g., regularly spaced point bars). Indicators of downcutting include: a low vertical scarp at the streambank's toe, high streambanks with woody vegetation growing below the top of the bank, excessive bank erosion, and exposed pipe once buried under the stream. Natural channels have no incised channels if there has been significant watershed-wide disturbance; they do not always meander and have pools and riffles.

Hydrologic Alteration
  Scoring:
10=flooding every 1.5-2 years, no signs of hydrologic alteration. Split channels may be present.
7=flooding only once each 3-5 years; limited channel incision; withdrawals occur but do not affect biota's available habitat.
3=flooding only once each 6-10 years; deep channel incision; withdrawals have major impact on low flow habitat for biota.
1=no flooding, or flooding occurs on a 1-year rain event; deep channel incision; structures preclude flood plain access; dams prevent flood flows; withdrawals cause severe loss of low flow habitat.
  Note:
Look for bankfull indicators appropriate to the hydrologic regime or any evidence of recent or past flooding. See if the reach has an incised channel or wide, shallow channels, is braided, or shows any signs, (i.e., structures, such as dikes/dams, and water withdrawals) indicating the stream's natural hydrologic equilibrium has been changed (hydrologic alteration). Is the stream's access to the floodplain limited or is there a change in its baseflow during dry periods? Determine if the land uses and management practices in the watershed have change din the recent (<5 years) past, and if these changes may have altered the annual hydrograph.
  Definitions:
Optimally, river/stream channels regularly inundate the flood plain, with the channel able to transport its annual water and sediment loads. Bankfull refers to the point reached when the the streams fill up to the top of the banks during mean annual flow events. An incised channel is one that is cut into the streambed. Braided streams have multiple channels with bars and islands and are stable for some combinations of slope, sediment size and sediment load. They are not necessarily unstable. Hydrologic alteration change the water load which may affect the channel's ability to transport its sediment, but does not change the sediment load delivered to the channel. Increasing flood flows together with an incised channel or levees (channelization) leads to bank and channel erosion. If the baseflow (low flow of groundwater entering the stream through banks and streambed) is decreased by irrigation withdrawals or poor land management practices, the diversity and abundance of aquatic organisms is diminished. Stable split channels (>2 smaller side channels, with woody vegetation along the banks) offer excellent habitat.

Riparian (Streamside) Vegetation Zone
  Scoring:
10=RVZ covers at least 2 active channel widths on both sides.
8=RVZ covers 1 active channel width, or if <1 width, covers entire flood plain.
5=RVZ covers ½ of active channel width on both sides.
3=RVZ covers ⅓ of active channel width on both sides, or filtering not functioning very well.
1=RVZ<⅓ of active channel width, or filtering not functioning at all.
  Note:
Look at both sides of the stream and determine the width of the riparian vegetation zone (RVZ) from the edge of the channel (active) out to the flood plain. In V-shape valleys with steep (>2% slope) channels, the extent of the riparian zone will be limited. There is a distinction between riparian and upland vegetation; if extensive upland vegetation is in the riparian zone, this is abnormal. The riparian zone's quality increases as its width and complexity of the woody vegetation within it increases. Can these practices be modified for less impact?
  Definitions:
Stream and river banks adjacent to the stream/river are "riparian zones" and consist of aquatic plants, sedges, rushes, grasses, forms, shrubs, and understory/overstory trees indigenous to the area. Riparian vegetation stabilizes banks, protects water quality by filtering pollutants and sediments from surface runoff, provides fish and wildlife habitat and organic material for the base of the aquatic food chain, provides thermal cover, slows and dissipates floods, and prevents erosion. Incomplete plant communities are not natural. Concentrated flows moving through the riparian zone without being buffered by vegetation reduces the filtering function of the riparian zone. The active floodplain is the valley floor adjacent to the stream channel that becomes flooded at high flows.

Bank Stability:
  Scoring:
10=Stable or low banks; ≧33% of banks' eroding surface area in outside meander bends has roots extending to base-flow height.
7=Fairly stable or low banks; <33% of banks' eroding surface area in outside meander bends has roots extending to base-flow height.
3=Fairly unstable or low banks, but usually are high with outside meander bends currently eroding.
1=Unstable banks or low banks, but usually are high; straight sections, inside edges of bends, and outside bends are all currently eroding; slope failures.
  Note:
Streambanks are being held in place by roots of riparian trees, shrubs, and perennial grasses, or eroding bank stability exists caused by (1) lack of vegetation, (2) heavy grazing areas directly adjacent to the stream, (3) animal paths, or (4) construction, farm machinery, and automobile traffic. For example, are meander bends eroding at an excessive rate compared to reference sites of streams (i.e., does bank top have overhanging vegetation and/or do some mature trees fall into the stream each year)? How much of the banks' slopes are unstable in relation to the streambanks' entire area?

Definitions:

Bank stability measures the degree to which the soils along the upper and lower streambanks erode (are worn away) and move downstream A healthy stream has a vegetated flood plain with a riparian community appropriate to the setting. Bank soils are held together by root masses (trees, shrubs, sedges, and rushes) which prevent bank scouring during bankfull events and floods. However, a healthy stream can also have as much as 50% of its banks eroding; in fact, stream meander bends all erode. Meander bends in meandering channels literally migrate by eroding the outer bend and depositing on the inner bend. This is not "unstable" behavior but, erosion is a problem if the rate is excessive compared to what is normal for the physiographic region. Bank instability can result from water and sediment load changes, or disconnection from the floodplain (via dykes and levees, etc.). However, in some settings, this is natural.

Water Appearance

Scoring:

10=Clear, or tea-colored and clear; see objects 3-6 ft deep, or less if slightly colored; no surface water sheen or film on rocks under water.

7=Usually clear except after storm events, and clears up quickly; see objects only 1.5-3 ft deep; color may be pale green; no surface water sheen.

3=Usually cloudy; see objects only 0.5-1.5 ft deep; pea-green in slow-moving parts; rocks are olive-green or have heavy green algal film; rotten eggs and/or ammonia smell.

1=Muddy almost all of the time; only see objects <0.5 ft; bright green slow parts; floating algal mats, surface scum, foam, sheen; smell of oil, sewage, pollutants, etc.

Note:

Compare the clarity, color, and turbidity of the stream to a healthy stream.

Definitions:

Suspended solids (soil, silt, clay, detritus, and organic matter) carried by runoff or by turbulence due to erosion, rainstorms, and high stream velocities cause turbidity, the measurement of the light scattering properties of water. Microscopic plans and animals suspended in the water column also contribute to turbidity; thus, moderately low levels of turbidity may indicate a healthy ecosystem. In general, the greater the depth you can see rocks in the stream bottom, the lower the turbidity. A stream may have a natural tea color, due to connecting wetlands and bogs, or be light-green due to algae caused by nutrient enrichment. However, a pea-green color indicates the stream cannot absorb the amount of nutrients it is carrying. Water is clearest during cool weather.

Nutrient Enrichment

Scoring:

10=Water is clear; little algae; diverse aquatic plants in low quantities.

7=Water fairly clear or pale green; some algae on subsurface objects.

3=Water is green; too many lush green macrophytes and algae (especially in warm months).

1=Water is pea-green, gray, brown water; dense algae mats and macrophyte stands; clogged stream.

Note:

A low quantity of a diversity of aquatic plants such as algae and macrophytes (floating and rooted aquatic plants) in clear water is healthy and normal. Too high or low levels of nutrients can been measured by water color, presence of algal mats, or too dense growths of green macrophytes. Nutrient concentrations may vary with water depth. This assessment is temporal; an assessment in spring (during high flow) may be different from one made in winter during low flow.

Definitions:

Nutrients (e.g., nitrogen and phosphorous) nourish macroscopic plant (macrophytes) growth. All stream animals need some algae and macrophytes for food and habitat. Too much nutrient enrichment from synthetic fertilizers and human and livestock manure, urine, and wastes results in pea-green water color, algae mats, and dense stands of macrophytes (floating and rooted). Excessive nutrient loads stimulate plant growth, algae blooms and, when plants die and decompose, a decrease in dissolved oxygen concentration, which can cause fish and aquatic community kills.

Instream Fish Cover

Scoring:

10=>7 types of cover

7=6-7 types of cover

5=4-5 types of cover

3=2-3 types of cover

1=0-1 types of cover

Note:

Count the number of different types of cover that provide aquatic macroinvertebrates with attachment and structure, and hiding places for fish, present in large amounts, in the stream in a stretch equal to 5 times the active channel width.

Definitions—Cover Types:

Logs (fallen trees/tree parts), woody debris (trunks, snags, branches, dense mats of tree roots at or beneath the surface), Deep pools (smooth undisturbed surface, generally slow current, 75-100% deeper than average stream depth), Riffles (broken water surface, rocky/firm substrate, moderate-fast current, <18 in. deep), Isolated/backwater pools (detached from main channel, having no flow except in high water season), overhanging vegetation (shrubs, trees, vines, perennial herbaceous vegetation reaching out over surface), Boulders (rounded stones>10 in. diameter, or slabs>10 in. in length)

Cobbles (stones 2.5-10 in. diameter)

Undercut banks (eroded "pockets" that extend horizontally beneath the bank surface), Dense macrophyte beds (thick emergent, floating leaf, or submerged aquatic vegetation).

Obstacles to Fish Movement/Migration

Scoring:

10=none.

7=water withdrawn seasonally prohibits fish movement within the reach.

5=diversions, dams, drop structures, culverts (<1-ft drop) are within the reach.

3=diversions, dams, drop structures, culverts (>1-ft drop) within 3 miles of reach.

1=diversions, dams, drop structures, culverts (>1-ft drop) within the reach.

Note:

Find out what human-made or natural obstacles are within 3-5 miles upstream/downstream as well as within your stream's reach. See if there are structures that have no drop but that still pose an obstacle to fish migration/movement. For example, a culvert can pose a barrier, even with no drop, because it causes the stream to flow with a high velocity. The assessment of this parameter may also be temporal; high stream velocities in spring may be barriers to some migrating fish.

Definitions:

Human-made (culverts, dams, diversions, drop structures, and seasonal water withdrawals) and natural (waterfalls and boulder/tree dams) obstacles to fish migration or the movement of other aquatic organisms, such as fresh water mussels, can prevent them from reaching the breeding and foraging habitats they depend upon, or isolate them from other populations of fish and other aquatic animals. Fish can migrate around beaver dams and single, large culverts which have deep enough water, and no slope, which results in a lower stream velocity. But excessive flow velocities in an impacted channel during spring runoff are also a fish barrier for spring migrators because shallow depths are a passage barrier for fall migrators. In general, if the Froude number (Fr) approaches 1, there is a fish barrier. The Froude number is calculated by dividing the mean velocity (m/s) by the square root of the product of g, the acceleration due to gravity (m/s) and the hydraulic depth. Thus, Fr<1 indicates a slow or tranquil flow; Fr=1 indicates a critical flow; Fr>1 is a fast or rapid flow.

Pools

Scoring:

10=Abundant deep and shallow pools; pools are at least 5 ft deep; hard to see greater than 30% of pool bottom 7=Present (but not abundant) pools; pools are at least 3 ft deep; hard to see 10-30% of pool bottom 3=Present, shallow pools less than 3 ft deep; hard to see 5-10% of pool bottom 1=No pools; or you can see entire stream bottom Note:

Walk along the stream with the survey rod to measure the number and variety of pools. In deeper streams or streams where you can't see the bottom, you may not be able to score them. Score for each channel type: meandering, braided, plane bed, cascade, step/pool, etc.

Definitions:

Pools have slow flow, flat water surfaces, and fine bed sediment. Healthy streams have a mix of shallow and deep pools. The mix of shallow and deep pools and pool spacing is a function of the channel type. Pools are abundant if there is more than one pool every 4 channel widths. Shallow pools are less than 1.5 times deeper than the average stream depth, and deep pools are almost twice as deep as the general depth. Deep pools are found on the outside of meander bends. Note: Pools are abundant if each meander bend has a deep pool. This is only relevant for specific stream types.

Pool—Riffle Formations are the key to river meandering and are a characteristic feature of gravel bed streams and rivers. Because they control water and sediment movement, they are vital to sustaining ecological diversity.

Insect/Invertebrate Habitat

Scoring:

10=≧5 habitat types; stable substrate, full colonization possible.

7=3-4 habitat types; stable substrate, some overhanging branches that will become habitat.

3=1-2 habitat types; unstable substrate or substrate is removed.

1=0-1 habitat type.

Note:

Count the number of substantial cover and habitat types within a stream section equal to five times the active channel width that can provide optimal conditions for insect/invertebrate life.

Definitions:

Cover and habitat types include woody material (such as debris, old, submerged logs, stumps, and branches), and others such as leaves, plant stems, root systems, undercut banks, cobble, boulders, coarse gravel, and rock bottoms and crevices. Stable substrate—the surface of the stream bed, rocks, fine sediment, leaf packs, and woody material—is essential for insect and invertebrate life cycles and provides optimal conditions. Unstable substrate occurs when scoured out by high stream velocities, too much sediment loading, or frequent flooding. Full insect/invertebrate colonization needs optimal conditions.

Canopy Cover

Scoring:

Assign NA if the active channel width is greater than 50 ft or if woody vegetation is naturally absent.

For Coldwater Fishery

10=>75% shaded; 2-3 ml. upstream generally well-shaded.

7=>50% shaded; or, >75% shaded, but poorly shaded 2-3 ml. upstream.

3=20-50% shaded.

1=<20% shaded.

For Warmwater Fishery

10=25-90% shaded, with mixed conditions

7=>90% shaded; full canopy and same shading throughout reach.

3=Intentionally Left Blank.

1=<25% shaded.

Note:

With overhead sun and leaves in full bloom, for active channels <50 feet in width that have woody vegetation, estimate the area of shaded water surface, no shade, or poor shade in your reach and the canopy cover 2-3 miles upstream.

Definitions:

Canopy cover is the leaves and tree branches that make up the riparian vegetation and that provide shaded water surface, keeping water temperatures cool in the summer and moderate in winter. Mixed conditions means shaded belts, sunny patches, and shaded reaches. Algae growth is kept down by cooler, shaded water, which holds dissolved oxygen (needed by fish to breathe) better than warm water. Shrub/tree roots keep streambanks in place, prevent erosion by slowing/dissipating floodwaters, and trap sediments/pollutants. Fish, insects, and other invertebrates thrive in streams with optimal vegetation and canopy cover. The canopy cover 2-3 miles upstream affects the water temperature at your reach.

Scoring Using Aerial Photography:

Estimate the canopy cover (when tree leaves are all open) of the stream's surface.

>90%=cannot see surface 70-90%=can see patches of surface or slightly visible 40-70%=can see surface, but not banks 20-40%=can see surface; banks visible sometimes <20%=can see both surface and banks Manure/Human Sewage Presence Scoring:

Assign NA if there are no livestock operations or human waste discharges present.

5=livestock have access to riparian zone, but not to stream.

3=manure found occasionally in stream; floodplain has wastes that could runoff into stream.

1=manure extensive on banks or in stream; untreated human waste discharge pipes or failing septic systems present.

Note:

If human sewage and/or livestock manure are present, score this parameter. Slow-moving stagnant water with excessive algae blooms may indicate excessive nutrient enrichment from manure.

Definitions:

Livestock manure and urine, flooding or runoff of stock pens, barnyards, and pastures, and human sewage discharges into streams causes diseases due to harmful bacteria/viruses and fecal coliform, as well as excessive nutrient load and eventual eutrophication (dissolved oxygen depletion). Areas with stagnant or slow-moving water may have moderate to dense amounts of vegetation or algae blooms, indicating localized nutrient enrichment from manure.

Salinity

Scoring:

Assign NA if there is no known elevated salinity from human-made sources in the stream.

5=some salt-tolerant vegetation (such as tamarix or salt cedar) by stream; little or no wilting, bleaching, leaf burn, or stunting of aquatic vegetation 3=predominance of salt-tolerant vegetation by stream; significant wilting, bleaching, loss of plant color, leaf burn, or stunting of aquatic vegetation; some whitish salt crusts on streambank.

1=most all vegetation is salt-tolerant type; severe wilting, bleaching, leaf burn, or stunting of aquatic vegetation; whitish salt crusts on streambank.

Note:

Both human-made and natural sources of elevated salinity (salt) levels can occur in a stream. If human-made, it may be reduced.

Definitions:

Salinity is salt accumulation in soils. Natural sources of salinity are the weathering of soils/geologic materials, or when water percolates into natural saline seeps that are then wicked up to the surface. Human-made salinity sources include heavy/improper practices of irrigation and oil/gas well operations. A breakdown of soil structure, decreased infiltration of water, and potential toxicity results from high salinity. Salinity alters the ionic strength in streams (the total concentration of positively or negatively charged atoms [ions] in solution) adversely affecting fish, aquatic vegetation, and macroinvertebrates.

Riffle Embeddedness (if Applicable)

Scoring:

Assign NA if there are no riffles or they are a natural feature that should be present, but are not.

10=Gravel or cobble particles are <20% embedded

8=Gravel or cobble particles are 20-30% embedded

5=Gravel or cobble particles are 30-40% embedded

3=Gravel or cobble particles are >40% embedded

1=Riffle is completely embedded

Note:

Use your fingertips to pick up gravel/cobble particles in riffles and estimate the percentage of them that is embedded (buried) in fine sediment. Then probe the bottom with a metal rod to measure how deep the original stream bottom is buried under the fine sediment.

Definitions:

Riffles are natural shallow areas where the water breaks over rocks or other objects, usually occurring every 3-10 widths, and often downstream from a pool. Riffle existence and spacing is a function of channel type. They have fast flow, steep water surface, and coarse bed sediments (vs. pools, which have fine sediments). Riffle embeddedness measures how much the gravel and cobbles are buried by fine sediments. This affects their suitability as habitat for insects and macroinvertebrates. Both the diversity and abundance of fish (for spawning, egg incubation, and feeding) depend on riffles.

Macroinvertebrates Observed

Scoring:

15=Predominantly Group I (intolerant) species with good species diversity present (not just a single Group I species present). Indicates a healthy stream.

6=Predominantly Group II (facultative) species present. Indicates some pollution present.

2=Predominantly Group III (tolerant) species present. Indicates significant pollution.

−3=Minimal number of species or no macroinvertebrates present.

Note:

Collect and identify the macroinvertebrates (Group I, II, or III) in the stream using the Kick Seine and macroinvertebrate identification chart. The aquatic health of the stream can be evaluated by the abundance and type of benthic macroinvertebrates.

Definitions:

Macroinvertebrates are animals with no backbones that at their widest part are larger than 0.5 mm, or approximately 0.02 inches. Group I (intolerant) includes caddisflies, mayflies, stoneflies, hellgrammites; they do not survive in polluted water. Group II (facultative) can tolerate some pollution, and includes damselflies, aquatic sowbugs, and crayfish. Group III (tolerant) includes midges, crane flies and leeches.

Note:

It is possible that a habitat may be in recovery and may support a high number of intolerant insects; assigning a negative number decreases the score more than by assigning a zero. The total score is then divided by the number of elements scored to get an average score. Expanding the range on the macroinvertebrates gives this parameter a greater weighting in the derivation of the average score.

Total Score:

Sum of the values of each scored parameter. Computed by the handheld computer processing means software of the present invention.

Parameters Rated:

Number of parameters rated. Does not include those Not Assessed. Computed by the handheld computer processing means software.

Average Score:

The total score divided by the number of scored parameters. Computed by the handheld computer processing means software.

3. Morphological Parameters

The basic assessment of a stream reach includes measuring several morphological parameters. The reach selected is generally twelve to fifteen times the bankfull width. The evaluator collects the following parameters and records them into the handheld computer processing means software, which computes several quantitative measurements (for example, automatic calculations of survey station centers). The parameters for Dominant Substrate, Cross Section, Longitudinal Survey, and Stream Velocity are described below as they are displayed on/by the handheld computer processing means software of the present invention. The evaluator conducts at least two cross section surveys.

3A. Dominant Substrate

Walk the entire reach and estimate the percentage of bed material that falls into each of these size classes so that the total equals 100%.

Dominant substrate refers to the size and type of materials making up the stream bed. The value is expressed as a percentage. The dominant substrate can serve as an indicator of habitat values, disturbances and ecological potential, and the composition of stream substrates can be changed by the alteration of the channel and the influx of sediment from upland erosion.

Bedrock
 Underlying solid rock
 Boulder
10 in. or >256 mm
 Cobble
2.5-10 in. or 64-256 mm
 Gravel
0.25-2.5 in. or 7-64 mm
 Sand
<0.25 in. or <7 mm
 Silt/Mud
<0.08-0.16 in. or <2-4 mm 3B. Cross-Section Locate a section of stream that is characteristic of the entire reach under study, and preferably free of development. Hydraulic information can be better analyzed from a riffle section.

The cross section data are useful for future geomorphic assessments; to calculate maximum flows, average flows, sheer stress, and scour depth, for stream classification and to document channel characteristics.

Survey Mode:

Elevation points can be measured either relative to the survey instrument head or relative to a known survey point or monument (i.e., relative or absolute). Typically, the elevations taken for stream assessments are relative to the survey instrument head (known as relative rod readings), but sometimes the field technician wants to work with actual (absolute) elevations (actual elevations). Some survey equipment can automatically compute the absolute elevations during the course of the survey.

For relative elevations, the equipment measures changes in elevation relative to the position of the head. A field technician either looks through the transit level at a rod held by another technician and reads the number off the rod (essentially a long measuring stick), or uses a rotary laser level which sends out a laser beam. In this case, the field technician holds the rod and moves a small receiver up or down until it strikes the laser beam. S(he) then notes the reading from the rod.

With relative elevations, the rod readings are higher for deeper parts of the stream (because the distance from the ground to the instrument head is longer); with absolute elevations, the elevations are lower in the deeper parts of the stream. Thus, we need to know which method one is using so the cross section can be graphed properly. If we take absolute elevations and graph them as if they were relative readings, the graph will be upside down.

Select Relative if you are using relative rod readings; Absolute if your readings are actual elevations.

Vertical surveys determine the heights, or elevations of objects. Surveys may be further classified as relative, or absolute.

Relative surveys measure the relative elevation of the ground surface (or other locations) below the elevation of the survey instrument. For example, the elevation of the top of the streambank may be 5 feet below the instrument, while the streambed may be 10 feet below the instrument.

In comparison, the absolute elevation is the height of the ground surface above a vertical reference, such as mean sea level or a local benchmark.

Channel Configuration:

Determine if the stream contains one defined channel (straight or meandering) or contains multiple main channels (braided or anastomising).

Briefly, straight streams have a single channel with a meandering thalweg, whereas meandering streams have a single winding channel, usually with well-defined banks.

Braided streams have multiple channels with bars, islands, and constantly shifting channelways, and anastomosing streams have multiple channels with relatively permanent, stable, vegetated islands.

Observations: Upstream/Downstream:

Record observations, including photo and text notes, of the reach upstream and downstream of the location of the cross sectional transect. Photos are automatically assigned to time/date stamp and location coordinates. Left bank and right bank are assigned facing downstream.

Flood Prone Width:

Measure the flood prone width using a tape or range finder.

Based on the flood prone width, 16 evenly spaced stations will be automatically generated at which to survey the elevations for the cross sectional survey. This cross sectional transect of the stream channel should include points that extend beyond the stream channel at points of similar heights in elevation.

The Flood Prone Width is the width of the floodplain and active channel that is subjected to regular (every ~2-5 years) flooding, as indicated by topography, soil/substrate, and vegetation community. Changes in vegetation types, flood deposits of fine woody materials, and change in slope are often good indicators of the flood prone width. Changes in vegetation are typically presented as a transition from riparian vegetation to upland grasses and/or other mesic species that have fewer water requirements.

To compute the center distances of the 16 rod stations, the flood prone width (entered by the technician into the computer software) is divided by 15, and that figure is added back progressively from 0 to created 16 rod stations across the stream. The flood prone width is the width of the floodplain and active channel that is subjected to regular (every ~2-5 years) flooding, as indicated by topography, soil/substrate, and vegetation (riparian).

Note:

Additional stations can be inserted in case the selected stations do not capture prominent breaks in slope or deep spots in the stream.

Cross-Section Elevations

Take an elevation reading at each station center. A station is the linear distance along the cross sectional transect at which the elevation is measured, from left bank to right bank, looking downstream. The first station is recorded on the Left Bank (LB) and is designated "0". The last station is recorded on the Right Bank (RB).

Water Surface Elevation:

Elevation of the water surface at the time of the survey.

Max Depth Elevation:

The maximum depth will automatically be computed based on the maximum depth at one of the stations; or, enter the rod reading from the deepest part of the stream.

Bankfull Elevation:

Input the bankfull elevation. Bankfull elevation is the elevation of the water surface at bankfull discharge, or the discharge that just fills the stream to its banks. The bankfull discharge is often thought of as the channel forming discharge, and in many cases has a recurrence level of 1.5 to 2 years. Characteristics may include the top of the point bar, a change in vegetation, a change in the slope, the top of an undercut slope, a change in particle size, drift lines and water marks.

Bankfull Width:

Measure the bankfull width at each cross section. Determine the bankfull width by observation of changes in vegetation, slope, particle size, drift lines, water marks, scour lines, and/or the top of an undercut slope or point bar.

Derived Flood Plain Width:

Measure the width at 2 times the bankfull depth to obtain the derived floodplain width.

In a very narrow (or confined) valley, the derived floodplain width is not much greater than the bankfull width (the width of the bankfull channel at bankfull discharge). In a wide alluvial valley, the derived floodplain width may be many times greater than the bankfull width. For example, both a very wide valley and a narrow canyon may have a bankfull channel that is 25-ft wide and 4-ft deep. The derived floodplain width is measured in each valley at 8 feet above the deepest part of the cross section, or twice their bankfull depth. In the wide valley, the valley may be 100-ft wide 8 ft above the channel, whereas in the narrow canyon, the valley may only be 40-ft wide at this elevation.

3C. Longitudinal Survey

The longitudinal survey measures the rate of decrease in the stream's elevation from upstream to downstream, or the stream's gradient. The longitudinal profile should be measured over a distance equal to 12 times the bankfull width.

Survey Mode:

Select Relative if you are using relative rod readings; Absolute if your readings are actual elevations.

Vertical surveys determine the heights, or elevations of objects or the ground surface. Surveys may be further classified as relative, or absolute. Relative surveys measure the relative elevation of the ground surface (or other locations) below the elevation of the survey instrument. For example, the elevation of the top of the streambank may be 5 feet below the instrument, while the streambed may be 10 feet below the instrument. In comparison, the absolute elevation is the height of the ground surface above a vertical reference, such as mean sea level or a local benchmark.

Survey Length:

Ideally, the longitudinal profile should be measured over a distance equal to 12 times the bankfull width. Locate and flag the upper boundary and lower boundary of the survey length to determine their elevations. Measure the survey length (automatically computer based on the bankfull width once you have surveyed your cross section, or input yourself) upstream and downstream from your cross section, following either the stream centerline (preferred) or either bank.

The survey length is the run, or the stream distance (not the valley distance) of the reach over which you measure the stream gradient.

Note: In field situations where it is impractical to survey 12 times the bankfull width (such as large rivers or situations where brush/vegetation obscures your line of site), you can override the survey length. Look for a representative reach (i.e., one that accounts for spatial heterogeneity and provides an "average" slope). An approximate slope can be determined from a topographical map. Alternatively, a locally representative slope can be determined with a rod and level.

Valley Length:

Measure the valley length over the exact same reach that you measure the survey length. You may enter it at the same time that you measure the gradient survey.

The straight line length of the valley along the same reach as the survey length is measured. This is usually obtained by topographic map, or by measuring the straight-line distance from the upstream extent of the longitudinal survey to the downstream extent.

Upstream ElevationMeasure the upper boundary elevation and the lower boundary elevation at both ends of the survey length using rod and level. In situations where it is impractical to survey both upper/lower boundaries from one location, the boundary can be determined from a topographical map, or you may need to do multiple surveys.

Downstream Elevation:

Measure the upper boundary elevation and the lower boundary elevation at both ends of the survey length using rod and level. In situations where it is impractical to survey both upper/lower boundaries from one location, the boundary can be determined from a topographical map, or you may need to do multiple surveys.

Rise:

The vertical change in elevation over the survey length. Automatically calculated.

Run:

The distance over which the elevation change is measured; same as Survey Length. Automatically calculated.

Gradient:

The gradient is the drop in a stream's elevation along its course expressed as a slope or ratio: equal to Rise/Run. Automatically calculated.

3D. Stream Velocity

A Velocity Observation button, a help button, a field for recording the Velocity Length, a table for recording Time and Velocity, and Average Velocity field.

The help button displays the following text:

Velocity can be measured either by a flow meter or by timing an object flowing in the stream (Float Method).

Flow Meter Method:

For larger streams/rivers, use a flow meter to record velocity measurements. Velocity should be taken at 5 points across a channel at 60% of the local maximum depth. Enter the velocity readings from the flow meter in the Velocity column of the table. Ignore the Velocity Length and Time fields. The Average Velocity is automatically computed.

Float Method:

For smaller rivers/streams, use a neutrally buoyant object (a float ball, an orange, or full water bottle) to record the velocity of the upper 80% of the water column. Enter the Velocity Length. Record (in second) the Times in the table that it takes the object to float the velocity length. For example 1 minute 15 seconds should be entered as 75 seconds. The Velocity and Average Velocity are automatically computed.

Test velocity over a known distance, and over several runs and riffles to obtain a more averaged measurement.

Velocity Length:

Straight-line distance in a relatively straight riffle reach. Entered if doing timed velocities.

Time:

The time it takes object to float the velocity length in seconds. Example: 1 min 15 sec. should be entered as 75.0 sec. Entered if doing timed velocities.

Velocity:

Entered if recording velocities using a flow meter. For timed velocities, calculated from Velocity Length and Time.

Average Velocity:

Computed average of recorded velocities

4. Disturbances Affecting Stream Health

Streams ecosystems function in dynamic equilibria between many variables: water quality variables e.g., nutrients and temperature), flow variables ((energy, velocity, flooding), and morphological variables (stream gradient, sinuosity, width, depth, sediment). Further, healthy streams and rivers withstand natural disturbances (floods, fire, drought, etc.) up to a certain magnitude, but may be structurally altered by catastrophic evens such as landslides or extremely large floods. However, a variety of human activities disrupt this equilibrium with adverse results, including losses of energy, streamflow, habitat (for fish, flora, and wildlife), recreational value, and natural beauty, and increases in pollution, abnormal flooding, and bank erosion, etc.

Twenty-two types of disturbances are assessed during this section of the handheld computer processing means software protocol (see Table 1). The evaluator observes the assessment reach and checks the box next to those disturbances that are present from a list. Examples and definitions of each type of disturbance are provided in the help files. Observations of each disturbance can be recorded.

TABLE 1

Types of Disturbances

| | | | | |
|---|---|---|---|---|
| Vegetative Clearing | Dams | Levees | Soil Exposure or Compaction | Irrigation and Drainage |
| Channelization | Contaminants | Hard Surfacing | Overgrazing | Roads and Railroads |
| Streambank Armoring | Trails | Exotic Species | Utility Crossings | Reduction of Floodplains |
| Streambank Disturbances | Dredging for Mineral Extract | Land Grading | Bridges | Woody Debris Removal |
| Withdrawal of Water | Piped Discharge Contaminant Outlets | — | — | — |

When the data is transferred from handheld computer processing means to the base computer processing means, the base computer processing means software analyzes the disturbances present to identify potential cumulative effects to the assessment reach.

This important toll included within the base computer processing means software can help to identify causes and effects of observed problems (i.e., streambank armoring), an approach that is often more effective than attempting to simply treat the observed symptoms (i.e., streambank erosion) when considering restoration solutions.

The base computer processing means software provides the following definitions of each of the disturbance types:

Vegetative Clearing:

The removal of streamside or riparian vegetation for a variety of reasons including timber harvest, farming, livestock grazing, residential or commercial development, road building, or recreation. Indications of vegetative clearing may include tree stumps, willow stubs, slash piles, skid roads, and/or timber landings. Heavy grazing may cause shrubs or trees to appear stunted or have an "umbrella" appearance.

Channelization:

The manipulation of a stream channel to increase the rate of water flow through the channel. Manipulation may include deepening, widening, straightening, armoring, or other activities that change the stream cross-section or other aspects of stream channel geometry to increase the rate of water flow through the stream channel. Channelization is often performed in an attempt to protect roads, culverts, bridges, residential/commercial structures, or avoid flooding. Indications of channelization may include unnaturally straight channels, sometimes combined with piping or culverts, high water velocities, bank erosion, and/or downcutting. Historical photos can often provide clear evidence of channelization.

Streambank Armoring:

Check for the application of "hard" materials, such as rock or concrete, to streambanks to strengthen the bank against further erosion and to dissipate water's erosive force against the soil. The most common hard-armor technique is riprap, which consists of placing large rocks in the water and up the slope of the eroding shoreline. Evidence of hard armoring may include imported rock or boulders larger than natural substrates, large pieces of concrete, gabions (wire baskets filled with rock or concrete) or even car bodies.

Streambed Disturbances:

An activity that alters the streambed—the natural substrate lining a stream channel. Common sources for disturbance include low-water fords for vehicular crossing, boat ramps, culverts, bridges, docks with pilings, dredging or deepening of the channel bed and/or point bars or activities that cause an incised channel. Foreign materials inside the stream channel such as culverts, or concrete channel linings, are good indicators of possible streambed disturbances. Evidence of incised channels includes a terraced top bank, indicating an abandoned floodplain. The channel may appear deep, with steep, vertical banks, and little variation in water flow rates (no pools and riffles).

Withdrawal of Water:

The removal of water from the stream for purposes other than irrigation, such as mining Can result in "dewatering", a condition in the stream channel when the water flow occurs within the permeable streambed sediments, so little or no surface water is left. Common in small streams with considerable water demands. Changes in the quantity of water leaving a watershed are directly proportional to the quantity of impervious surface or reduced infiltration in a watershed. Indications are extended periods of very low flows which differ from historical flow records. Examination of water rights and land use activities may show that dewatering is being caused by a variety of reasons such as demands on supply for drinking water, use as an industrial coolant, use in mining practices, or to supplement water in other streams or water impoundments.

Dams:

Any structure that serves to impound water on a permanent or temporary basis and raises the water level above the usual water height. Dams can range from small, temporary structures constructed of stream sediment, to huge multi-purpose structures used for hydropower, navigational locks, and irrigation. Dams can be manmade, or naturally occurring, such as beaver dams.

Levees:

A natural or man-made earthen embankment along the edge of a stream, lake, or river, usually for the purpose of restraining the flow of water out of its bank in order to protect outer lowlands from flood waters. Unlike dams, levees serve to restrict water only in times of high flow. Levees are usually constructed along the banks of rivers and streams from native soils, but may be constructed from hard materials such as concrete. Levees may be categorized as directly adjacent to the stream (within 1 active channel width to stream); moderately adjacent to the stream (within 2 active channel widths to stream); or as an emergency levee that allows floodplain access (>2 active channel widths to stream).

Soil Exposure or Compaction:

Soil exposure refers to bare soil without active vegetation in the riparian zone. Soil compaction reduces critical pore space in the soil that allows for the storage and movement of air and water in the soil. Both can be caused from vehicular travel, timber harvest practices, livestock crossings or livestock congregation in the riparian zone, or structures directly adjacent to stream. Indications of soil exposure and compaction are absence of vegetation, tire tracks, trails, hoof prints, rills and gullies, low soil pH, and/or low organic matter.

Irrigation and Drainage:

Diversion of surface water from a stream or river for irrigation purposes. Indications include pipes, ditches and headgates or pivot irrigation systems. Central pivot systems use aquifers which have diminished over time at very high rates as groundwater levels drop. Overappropriation of irrigation water rights can result in "dewatering", a condition in the stream channel when the water flow occurs within the permeable streambed sediments, so little or no surface water is left; common in small streams with considerable water demands. Drainage of wetland soils to be converted to agricultural production results in lowering of water tables and disrupting natural filtration systems necessary for slowing and purifying runoff. Streambank erosion also results from drainage. Indications can include subsurface tile drainage systems, constructed waterways, and drainage ditches.

Contaminants:

Any point or nonpoint source pollutants that render the water unfit for its intended use(s). Potential sources may include sewage treatments plants, agricultural operations, mines, residential or commercial development, industrial discharge, landfills or hazardous waste disposal areas. Indications may be unusual water color, unpleasant odors, algae blooms, low biomass, or proximity to a known source of pollutants.

Hard Surfacing:

Any impermeable hard surface that increases the rate and volume of runoff to a stream. Examples are parking lots, driveways, paved roads, and sidewalks.

Overgrazing:

Grazing practices that result in damage to the vigor, density and diversity of riparian vegetation. Overgrazing is a result of constant grazing pressure or repeated heavy grazing pressure during the growing season. Indications are riparian vegetation with a hedged or umbrella appearance; exposed, compacted soils; noxious weeds; and/or animal waste proximate to the stream.

Roads and Railroads:

Roads and/or railroads that run parallel to the stream corridor.

Trails:

Recreational, livestock, or wildlife trails that run parallel, and down to, the stream corridor. Look for narrow trails intertwining along the stream corridor. Trails may be accompanied by soil erosion, vegetative clearing, soil compaction or other disturbances to the stream.

Exotic Species:

Any noxious plant species, as identified by local, state, and/or federal agencies, found in the riparian zone and adjacent upland areas. Look for homogenous weed patches, often in areas of disturbed soil, and consult a field guide for positive identification.

Utility Crossing:

Any utility line that crosses stream—may include, buried power lines, gas lines, or telephone lines.

Reduction of Floodplain:

Any structure or development that prevents a stream or river from fully accessing its natural floodplain, thereby decreasing the natural function of the floodplain. Things to look for may include levees, dikes, barbs, jetties, roads, railroads, or other structures.

Dredging for Mineral Extract:

Removal of sediments from the bottom of water bodies for the purpose of separating and recovering mineral reserves. Evidence of mineral extraction may include waste rock and tailing bn disposal, increased turbidity, land disturbance, dust, dewatering and point source pollution.

Land Grading:

Reshaping the surface of land to planned grades, usually in areas where surface irregularities, slopes, obstructions, or surface drainage interfere with planned use, or where such use requires designed land surfaces. Indications of poor land grading practices may include soil compaction and displacement, soil erosion, vegetation removal, noxious weed colonization, and/or poor drainage. Other indications of land grading are elevated stream banks designed to reduce floodplain access; evidence of construction along stream; or evidence of past dredging activities.

Bridges:

A structure built over a stream or river to provide a way across for vehicles or pedestrians.

Woody Debris Removal:

Any activity that removes existing woody debris or prevents future woody debris deposits. May include removal of trees or logs to allow for boat access to a stream or river, or activities such as land clearing or logging. Indications include an absence of large woody debris and/or evidence of vegetative clearing.

Piped Discharge/Contaminant Outlets:

Point source discharge that terminates at or near the stream. Look for open pipes, ditches or other outlets.

After performing the site visit according to the method of the present invention, and entering the data recorded on the handheld computer processing means into the base computer processing means, a user of the present invention can generate various reports using the computer software and system of the present invention. For example, the following types of user reports can be generated:

a. Baseline stream assessment report: A survey is conducted by the user to establish the current conditions of the stream/river. Rivers and streams are complex and vary in flowrate and depth throughout the year; as such, the baseline assessment captures the characteristics and parameters, some of which are qualitative, others of which can be measured quantitatively or semi-quantitatively, at a given point in time. This suite of measurements and observations (measured data) is then compared by the software of the present invention to a reference stream (for example, a healthy stream that is functioning normally), and may be stored in a database for comparative purposes in the future.

b. Water resource inventorying report: A determination of the quality and variety of streams or rivers within a watershed and how they are used (or not), misused, or threatened with misuse, or natural or human caused alteration is measured by the user and stored in handheld computer processing means. For example, such parameters as whether a river's frequent flooding natural or human-caused, how a mountain stream's channel that a logging company wants to re-route is going to affect the downstream fisheries and fish spawning sites, etc., is measured and stored in the handheld computer processor means in the field, and the data is then transferred to the base computer processor means to produce a water resource inventorying report.

c. Measurement of permit application requirements: This is similar to (f) below. Any activities which will discharge, fill, or dredge material into a freshwater stream (and lake or wetland), require a permit and must be reviewed (usually by the US Army Corps of Engineers) for compliance. The system and computer software of the present invention is used to present stream characterization data useful for determining if the stream or river is being used in a way that is compliant with an existing or proposed permit. For example, is it appropriate to build a sewage treatment plant on a river that floods every year or is it more appropriate to built the plant well off the floodplain?

For example, in Montana, a typical local conservation district "310 Permit" asks the following questions (an example answer is provided next to each question):

(1) type of project (example: bank stabilization)
(2) purpose of proposed project (example: barbs and riprap along approximately 5000 ft of riverbank)
(3) is any portion of work complete (example: work began in '97 but due to late date (on another permit), work is ongoing for '98-'99)
(4) describe the work you plan to do, i.e., what materials will be used, how much and what type of vegetation will be removed or covered with fill material, what equipment will be used? (example: 20,000 cubic yards of rock; no vegetation to be removed; track excavator, front-end loader, dump trucks.)
(5) what steps will be taken during/after construction to minimize soil erosion/sedimentation, effects on stream channel alterations, effects on streamflow or water quality caused by materials used or removal of ground cover, and effects on fish and aquatic habitat? (example: natural vegetation plus seeding of exposed areas with grass).
(6) what steps will be taken to prevent the risk of flooding or erosion problems upstream/downstream? (example: no significant effect—should minimize erosion and deposition in river).

The measurement of permit application requirements report collates and compares the entered data against the permit requirements, and notifies the user as to whether the requirements for obtaining the permit will be met.

d. River restoration report: Rivers and streams that have experienced adverse impacts, either human-caused or natural, are in need of restorative measures, if possible, to function the way they were intended by nature. Rivers and streams works in a complex hydrologic cycle. The present invention uses green technologies, such as the planting and establishing of healthy riparian vegetation for streambank stabilization, versus the conventional hard armor or riprap. For example, excess nitrogen from farm fertilizers, sewage and industrial pollutants cannot be filtered if the natural vegetation has been stripped away. The resulting die offs of fish, and the food chain upon which the aquatic organisms depend, can be eventually stopped if green technologies such as planting woody vegetation are used in river restoration work.

e. Aquatic and Riparian Habitat Enhancement Report: Similar to the river restoration report, based on entered data by the user, this report provides recommended techniques such as stream bank biostabilization, habitat design for natural self-sustaining systems both within the water and along the stream banks (the adjacent riparian or natural vegetation zone) and other sustainable restoration techniques in order to increase and restore the natural healthy ecosystem within a stream, river, or watershed for the benefit of the aquatic flora and fauna and the people that depend on clean water.

f. Permitting Report: (See c)

g. Streambank Stabilization Report: Streambank stabilization according to the present invention involves the beneficial impact to the natural stream and ecosystem by the use of various materials, designs and biologically-based construction methods, such as coir geotextile rolls, plants, rootwad composites, and planting native species vegetation. There are numerous causes for streambank destabilization and erosion, which is the wearing away of soil and rock that forms the banks of the stream. The removal of riparian vegetation (that binds the soil), cattle and livestock damage of vegetated streambanks and instream manure, levees, river channelization, roads, residential and commercial development, and river's edge agricultural cropland—all can cause instability and erosion of streambanks. Hard armor (using concrete, boulders, etc. as "riprap") and levees cause the energy of the stream or river to be increased and deflected downstream, causing further erosion. Effective streambank stabilization recommendations are provided by the method, computer software and system according to the present invention by identification of vegetative and bioengineering techniques for limiting streambank erosion, and are successful when the causes of the adverse impacts are properly diagnosed, the ecosystem and fluvio geomorphology is well-understood, and the green technologies used for restoration are properly implemented. To do so requires accurate and consistent data collection and analysis, which is possible using the present invention.

h. Post-Treatment Monitoring: Once restoration, stabilization or enhancement treatment activities have been implemented, monitoring is required to ensure that the restorative techniques are effective and sustainable. For example, stabilization of streambanks is affected by the local geology, physical characteristics of the stream or river and riparian zone, watershed and adjacent land uses, etc. The method, computer software and system of the present invention are employed to repeatedly collect and analyze data over time to track the effectiveness of the restoration techniques. For example, a coir log may have been emplaced to stop a progressive undercutting of a streambank. A site photo is taken, a GPS location is recorded, and other parameters are measured by the user and entered into the database via the software of the present invention. A year later, the site is revisited and another photo is taken, GPS recorded, etc., by the user. The user can then query the software of the present invention to calculate a comparison of the previously recorded data to the more recently recorded data to see if the coir log is effectively preventing the streambank from being undercut.

i. Trend Monitoring: How does the stream or river's characteristics change over time? What are the ongoing long-term water quality trends in the stream/river that has been assessed? Is the streambank eroding? How fast? The objectives of the monitoring are numerous: to implement a long-term program to measure, assess, and characterize the trends indicative of problems (poor water quality, loss of fish and aquatic organisms habitat, erosion and pollution problems, etc.) in order to prioritize problems and determine appropriate solutions (mitigations and restoration techniques). For a specific example, an increase in water temperature over time may be noted. For the purpose of assessing water temperature trends, the method, computer software and system of the present invention enables easy tracking and reporting of this data, makes it available to the user, and uses said data to determine the cause and likely effect or impact of the increase in water temperature (for example, fish kills). Once the cause is determined, appropriate recommendations to alter or change can be provided by the present invention.

j. Stream Inventory Reports: Stream inventory reports can be used to compare a range of measured habitat conditions by stream reach. These habitat conditions vary considerably between streams. Stream differences relate to past and current management activities, geology, elevation, aspect, climate and numerous other variables influencing watersheds, stream channels and floodplains. Stream inventory data of comparable watersheds and stream valleys stored on the database can be accessed to develop benchmarks or ranges of conditions anticipated in reference streams. This reference stream data can then be used by the software of the present invention to compare current conditions with reference conditions, so as to determine for example, dominant processes operating in the watershed, and restoration strategies that address the present gaps between historic and current conditions in watersheds.

Figure 3:
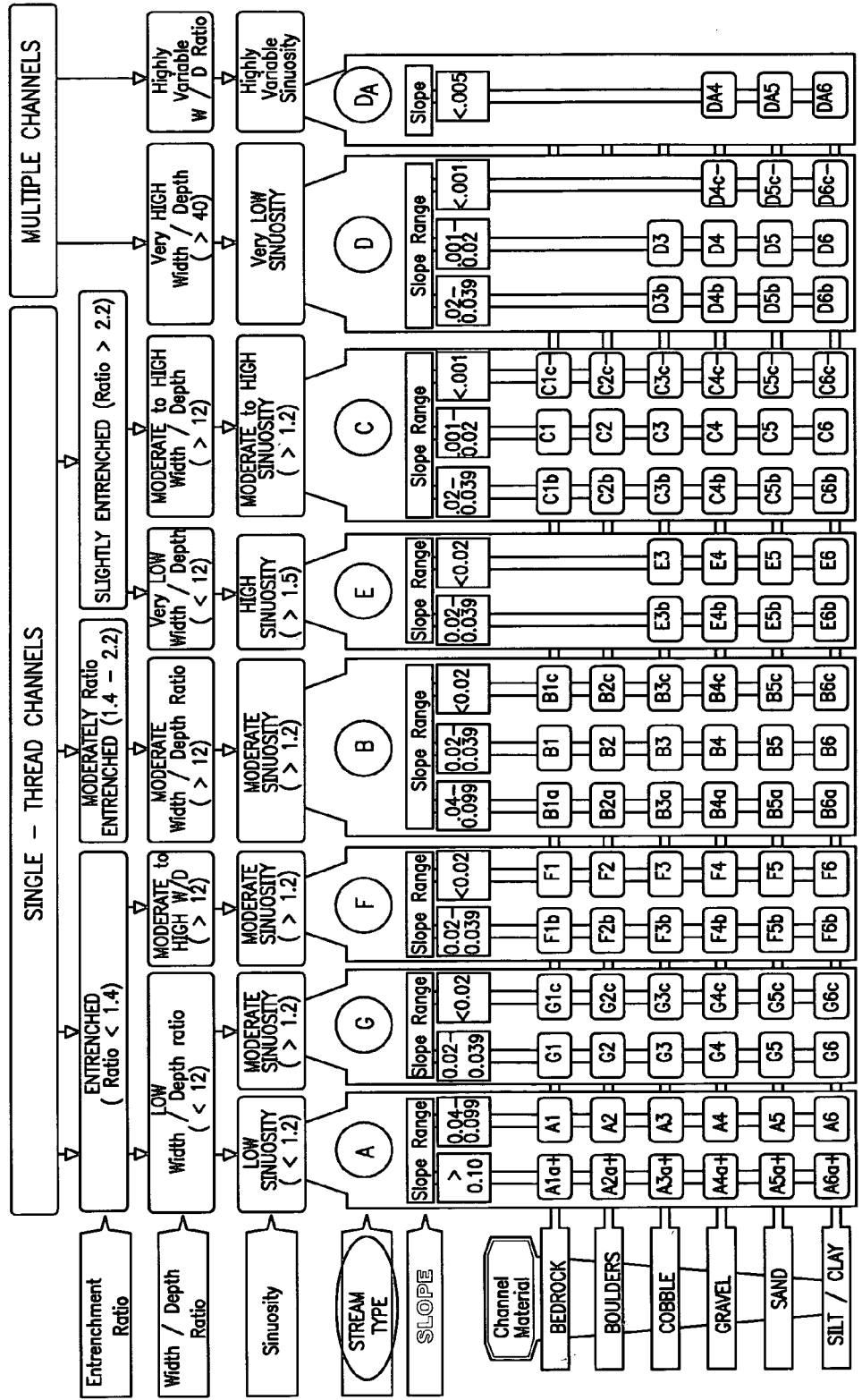
FIG. 3 is a chart describing the keys to the Rosgen Classification of Natural Rivers.

The computer software program of the present invention, which may be installed on a handheld computer processor means or a base (desktop) computer processor means, calculates the needed ratios to determine the appropriate stream classification using the Rosgen Classification of Natural Rivers, as shown in FIG. 3 herein. In particular, ratios and calculations include entrenchment ratio, width/depth ratio, slope, and sinuosity, combined with the identification of the channel as a single or multiple thread channel, and identification of the dominant channel substrate.

The user first observes and measures the river or stream to be classified, measuring entrenchment data (floodplain width and bankfull width), width/depth data, elevation data, channel data (i.e., whether the river or stream has a single or multiple thread channel), and dominant channel substrate material data (i.e., whether the dominant channel is composed of, for example, bedrock, boulders, cobble, etc.), of two or more reaches of the river or stream be assessed. This data is input into a handheld computer processing means having the computer software program of the present invention loaded thereon.

The computer software program of the present invention then calculates the entrenchment ratio, width/depth ratio, slope and sinuosity of the river or stream being assessed, and compares same, along with the channel data and dominant substrate data to Rosgen Stream Classification guidelines stored on a database within the handheld computer processing means, to determine the Rosgen Stream Classification of the river or stream being assessed.

Alternatively, the database may be in connection with a base (desktop) computer processing means. The entrenchment data (floodplain width and bankfull width), width/depth data, elevation data, channel data (i.e., whether the river or stream has a single or multiple thread channel), and dominant channel substrate material data (i.e., whether the dominant channel is composed of, for example, bedrock, boulders, cobble, etc.), of two or more reaches of the river or stream being assessed may be stored on the handheld computer processing means may. downloaded from the handheld computer processing means to the base computer processing means, the calculations of entrenchment ratio, width/depth ratio, slope and sinuosity of the river or stream being assessed performed by the software, and comparison of same, along with the channel data and dominant substrate data to the Rosgen Stream Classification guidelines stored on a database within the handheld computer processing means, to determine the Rosgen Stream Classification of the river or stream being assessed.

The computer software performs calculations of the above discussed as follows:

Substrate:
Sum substrate percentages
If Sum not equal 100%, display message
Stream Health Indicators:
Sum valid indicator scores
Average valid indicator scores
Display Sum
Display Count
Display Average
Cross Sections:
Survey Mode
Survey Mode = 1 for absolute, −1 for relative. For graphing elevations and
computations marked by *, multiply elevations by Survey Mode
Station Centers=
Divide Flood Prone Width by 15
Add result to previous station center to get next station center
Average Water Depth=
Select all elevations lower than or equal to the water level
Compute average
Average Bankfull Depth=
Select all elevations lower than or equal to Bankfull Depth
Compute average
Bankfull Channel Width (per survey)=
Select all elevations lower than or equal to Bankfull Depth
Determine minimum station center for selected elevations
Determine maximum station center for selected elevations
Compute maximum − minimum
Maximum Depth Elevation (per survey)=
Determine minimum of all elevations
Floodplain Width at 2 times Bankfull Elevation=
2 times Bankfull Elevation − Maximum Depth Elevation
Longitudinal
Survey Length=
Multiply Bankfull Width * 12
Upstream Station Center=
Compute −1 *Survey Length/2
Downstream Station Center=
Compute Survey Length/2
Rise=
Subtract Downstream Elevation from Upstream Elevation
Run=
Longitudinal Survey Length
Slope=
Divide Rise by Run
Gradient=
Compute Slope * 100
Entrenchment Ratio=
Divide floodplain width by Bankfull Width
If Floodplain Width at 2* Bankfull Elevation is > 0, use this -continued otherwise use Floodprone Width
Width/Depth Ratio=
Divide Bankfull Width by Average Bankfull Depth
Sinuosity=
Divide Survey Length by Valley Length
Rosgen Stream Classification=
Using Entrenchment Ratio, Width/Depth Ratio, Sinuosity, and Slope,
determine the Rosgen Stream Classification using
"Key to the Rosgen Classification of Natural Rivers"

-continued

Velocities:
5  Timed Velocity = Divide Velocity Length by Time
Average Velocity= Average all velocities
If doing timed velocities, Velocity Length must be > 0.
If Velocity Length is not > 0, assume measurement with flowmeter and average flowmeter velocities.
10  If Velocity Length is > 0, assume timed velocities and average computed velocities (velocity length/ time).

GLOSSARY

| | |
|---|---|
| Alluvial | Referring to deposits of silts, sands, gravels and similar detrital material, which have been transported by running water. |
| Alluvium | Stream-borne materials deposited in and along a channel. |
| Arid Climates | Dry climates where the measure of evaporation exceeds the amount of rainfall. |
| Armor | Artificial surfacing of bed, banks, shore or embankment to resist erosion or scour. |
| Bank | The lateral boundary of a stream confining water flow; the bank on the left side of a channel looking downstream is called the left bank, etc. |
| Bankfull Discharge | The discharge corresponding to the stage at which the natural channel is full. |
| Bank Protection | Revetment, or other armor protecting a bank of a stream from erosion, includes devices used to deflect the forces of erosion away from the bank. |
| Bar | An elongated deposit of alluvium within a channel or across its mouth. |
| Barrier | A low dam or rack built to control flow of debris. |
| Base Flood | The flood or tide having a 1 percent chance of being exceeded in any given year (100-year flood); the "base flood" is commonly used as the "standard flood" in Federal flood insurance studies. |
| Base Floodplain | The area subject to flooding by the base flood. |
| Base Flow | The flow contribution to a creek by groundwater; During dry periods, base flow constitutes the majority of stream flow. |
| Bed Load | Sediment that moves by rolling, sliding, or skipping along the bed and is essentially in contact with the stream bed. |
| Bench | A horizontal surface or step in a slope. |
| Best Management Practice (BMP) | A measure that is implemented to protect water quality and reduce the potential for pollution associated with storm water runoff; (2) any program, technology, process, siting criteria, operating method, measure, or device that controls, prevents, removes, or reduces pollution. |
| Bioengineering | The integration of living woody and herbaceous materials along with organic and inorganic materials to increase the strength and structure of soil. |
| Biotechnical Stabilization | Use of natural inclusions, living or inert, to reinforce soil and stabilize slopes. |
| Biotechnical Slope Stabilization | Integrated or combined use of living vegetation and inert structural components. |
| Buffer | A vegetated area of grass, shrubs, or trees designed to capture and filter runoff from surrounding land uses. |
| Buttressing | Lateral restraint provided by earth or rock masses and embedded structural columns. |
| Canopy | The overhead branches and leaves of vegetation. |
| Community (Plant) | Particular assembling of plant species reflecting the prevailing environment, soil type and management. |
| Construction Stake | See dead stout stake. |
| Container Plant | Seeded or pot-raised plants in containers of different sizes and materials; non-degradable containers are to be removed before planting. |
| Conventional Engineering | Engineered construction incorporating inert |

| | |
|---|---|
| (Hard Construction) | building materials such as aggregates, rock, concrete, steel, lumber, etc. without live vegetation (apart from incidental landscape planting). |
| Critical Flow | That flow in open channels at which the energy content of the fluid is at a minimum; also, that flow which has a Froude number of one. |
| Critical Slope | That slope at which the maximum flow will occur at the minimum velocity; the slope or grade that is exactly equal to the loss of head per meter resulting from flow at a depth that will give uniform flow at critical depth; the slope of a conduit which will produce critical flow. |
| Critical Velocity | Mean velocity of flow when flow is at critical depth. |
| Current | Flow of water, both as a phenomenon and as a vector. Usually qualified by adjectives like downward, littoral, tidal, etc. to show relation to a pattern of movement. |
| Cutting | A branch or stem pruned from a living plant. |
| Cut Slope | The open, steep face of an excavated slope. |
| Deciduous | Tree or shrub that retains its leaves for one growing season only, dropping them before the following winter. |
| Degradation | The process of by which stream beds lower in elevation; opposite of aggradation. |
| Denuded | Land stripped of vegetation. |
| Deposition | The settlement of material out of water. |
| Design Discharge | The quantity of flow that is expected at a certain point as a result of a design storm; usually expressed as a rate of flow in cubic meters per second. |
| Design Flood | The peak discharge (when appropriate, the volume, stage, or wave crest elevation) of the flood associated with the probability of exceedance selected for the design of a highway encroachment in a FEMA flood plain; by federal definition, the highway will not be inundated by the "design flood". |
| Design Frequency | The recurrence interval for hydrologic events used for design purposes; as an example, a design frequency of 50 years means a storm of a magnitude that would be expected to recur on the average of every 50 years; (see Probability of Exceedance). |
| Discharge | A volume of water flowing out of a drainage structure or facility; measured in cubic meters per second. |
| Disturbed Areas | Areas that have been purposefully cleared, grubbed, excavated, or graded by the contractor; ground surface that has been disrupted by construction activities, including construction access/roads, producing significant areas of exposed soil and soil piles; staging and storage sites are considered as part. |
| Diversion | (1) The change in character, location, direction, or quantity of flow of a natural drainage course (a deflection of flood water is not a diversion); (2) draft of water from one channel to another; (3) interception of runoff by works which discharge it through unnatural channels. |
| Ecosystem | A community of organisms interacting with one another and the environment in which they live. |
| Ecotype | Naturally occurring variant of a species which is adapted to a particular set of ecological or environmental conditions. |
| Encroachment | Extending beyond the original, or customary limits, such as by occupancy of the river and/or flood plain by earth fill embankment. |
| Energy Dissipator | A structure for the purpose of slowing the flow of water and reducing the erosive forces present in any rapidly flowing body of water. |
| Ephemeral | Of brief duration, as the flow of a stream in an arid region. |
| Erosion | Removal of surface soils and rocks by action of water, wind, frost, ice and extreme sun/heat; internal erosion leads to change of the earth structure and piping; closed vegetation is the best safeguard against erosion. |

-continued

| | |
|---|---|
| Erosion and Accretion | Loss and gain of land, respectively, by the gradual action of a stream in shifting its channel by cutting one bank while it builds on the opposite bank; property is lost by erosion and gained by accretion but not by avulsion when the shift from one channel to another is sudden; property is gained by reliction when a lake recedes. |
| Erosion Control | Vegetation, such as grasses and wildflowers, and other materials, such as straw, fiber, stabilizing emulsion, protective blankets, etc., placed to stabilize areas disturbed by grading operations, reduce loss of soil due to the action of water or wind, and prevent water pollution. |
| Establishment | Measures which enable fast and good rooting growth of artificially started vegetation. |
| Establishment Period | (1) Time between sowing of the seed and the stage at which the plant is no longer reliant on the nutrient supply in the seed; (2) time between planting and the stage at which special care is not required to ensure that all parts of the plant are functioning normally. |
| Existing Vegetation | Any vegetated area that has not already been cleared and grubbed. |
| Face | The outer layer of slope revetment. |
| Face Planting | Planting live cuttings and other vegetation in the frontal openings of retaining structures. |
| Flood Frequency | Also referred to as exceedance interval, recurrence interval or return period; the average time interval between actual occurrences of a hydrological event of a given or greater magnitude; the percent chance of occurrence is the reciprocal of flood frequency, e.g., a 2 percent chance of occurrence is the reciprocal statement of a 50-year flood; (See Probability of Exceedance). |
| Flood Stage | The elevation at which overflow of the natural banks of a stream begins to run uncontrolled in the reach in which the elevation is measured. |
| Flow | A term used to define the movement of water, silt, sand, etc.; discharge; total quantity carried by a stream. |
| Flow Regime | The system or order characteristic of streamflow with respect to velocity, depth, and specific energy. |
| Fluvial Geomorphology | The study of land forms created by and pertaining to the fluvial process. |
| Froude Number | A dimensionless expression of the ratio of inertia forces to gravity forces, used as an index to characterize the type of flow in a hydraulic structure in which gravity is the force producing motion and inertia is the resisting force; it is equal to a characteristic flow velocity (mean, surface, or maximum) of the system divided by the square root of the product of a characteristic dimension (as diameter of depth) and the gravity constant (acceleration due to gravity) all expressed in consistent units; $F_r = V/(gy)^{1/2}$ |
| Geotextiles | Durable high tensile strength synthetic construction fabrics used for separation, filtration, drainage, reinforcement and erosion control of soils and crushed aggredates; biodegradable fabrics are made from natural fibers such as coir, jute, flax, ramie, etc., and are used primarily for erosion control; also used as soil reinforcement in conjunction with brush layering (live gabions) as short-term subsurface filters, or as separators holding back soil behind geogrids in steep slopes pending establishment of vegetation. |
| Grade Stabilization | The maintenance of a gentle, noneroding gradient on a watercourse or land surface; usually accomplished by means of structural measures or by regrading (lengthening) the slope. |
| Gradient (Slope) | The rate of ascent or descent expressed as a percent or as a decimal as determined by the ratio of the change in elevation to the length. |
| Gravel | Rock larger than sand and smaller than cobble, arbitrarily ranging in diameter from 5 to 50 mm. |

-continued

| | |
|---|---|
| Ground Bioengineering | A general term for all categories of application of plant materials for soil protection and slope stabilization either on its own or in combination with mechanical methods. |
| Growth Habitat | The physical form and geometry of a plant - its above ground components. |
| Habitat | The area or environment in which an organism lives. |
| Headcutting | The cutting of the streambed to a lower elevation; progressive scouring and degrading of a streambed at a relatively rapid rate in the upstream direction, usually characterized by one or a series of vertical falls. |
| Hydraulic Gradient | A line that represents the relative force available due to the potential energy available; this is a combination of energy due to the height of the water and the internal pressure; in any open channel, this line corresponds to the water surface; in a closed conduit, if several openings were placed along the top of the pipe and open tubes inserted, a line connecting the water surface in each of these tubes would represent the hydraulic grade line. |
| Hydraulic Jump (or Jump) | Transition of flow from the rapid to the tranquil state. A varied flow phenomenon producing a rise in elevation of water surface. A sudden transition from supercritical flow to the complementary subcritical flow, conserving momentum and dissipating energy. |
| Hydraulic Mean Depth | The area of the flow cross section divided by the water surface width. |
| Hydraulic Radius | The cross sectional area of a stream of water divided by the length of that part of its periphery in contact with its containing conduit; the ratio of area to wetted perimeter. |
| Hydrograph | A graph showing stage, flow, velocity, or other property of water with respect to time. |
| Hydrologic | Pertaining to the cyclic phenomena of waters of the earth; successively as precipitation, runoff, storage and evaporation, and quantitatively as to distribution and concentration. |
| Hydrology | The science dealing with the occurrence and movement of water upon and beneath the land areas of the earth. Overlaps and includes portions of other sciences such as meteorology and geology. The particular branch of Hydrology that a design engineer is generally interested in is surface runoff that is the result of excessive precipitation. |
| Incised Channel | Those channels which have been cut relatively deep into underlying formations by natural processes; characteristics include relatively straight alignment and high, steep banks such that overflow rarely occurs, if ever. |
| Indicator Plant | Plant species indicating some specific characteristic of a certain locality. |
| Infiltration | The passage of water through the soil surface into the ground. |
| Inoculation | Method of artificially infecting shrubs and trees or herbaceous legumes with, respectively, mychorrhizae or rhizobium bacteria that normally live in symbiosis with them. |
| Interception | Part of the moisture remaining in the vegetation layer which evaporates; depends on the meteorological conditions and the vegetation. |
| Joint Planting | The insertion of live branch cuttings between openings or interstices of rocks, blocks, or other inert armor units and into the natural ground. |
| Laminar Flow | That type of flow in which each particle moves in a direction parallel to every other particle and in which the head loss is approximately proportional to the velocity (as opposed to turbulent flow). |
| Lateral Earth Pressure | The horizontal pressure exerted by soil against a retaining structure. |
| Lateral roots | Shallow roots running out sideways from stem. |
| Layering | The development of a new individual plant from a branch or stem that has rooted in the ground. |
| Legumes | Herbs, shrubs, and trees of the pulse family, as nitrogen gatherer because of a specific root clad bacteria; good ground improvers; many form |

-continued

| | |
|---|---|
| | specially strong and deep-reaching roots and are good ground stabilizers; an important part of seed mixes. |
| Levee | An embankment to prevent inundation, usually on or along the bank of a stream or lake to protect outer lowlands (dike). |
| Live Fascines | Bound, elongated sausage-like bundles of live cut branches that are placed in shallow trenches, partly covered with soil, and staked in place to arrest erosion and shallow mass wasting. |
| Live Pole Planting | Ground bioengineering technique comprising the installation by driving, or insertion into pre-drilled holes, of long live stakes, rods or poles of 1-2.5 m length of poplar or willow (or any plant which propagates from cuttings) at close centers for slope stabilization purposes as a form of live soil nailing. |
| Live Stake | Cuttings from living branches that are tamped or inserted into the earth; the stakes eventually root and leaf out. |
| Loading | The total amount of material entering a system from all sources. |
| Long or Pole Cutting | Ends of branches of tree willows and poplars, with end buds, 1-2.5 m long. |
| Mass Movement | The movement of large, relatively intact masses of earth and/or rock along a well-defined shearing surface as a result of gravity and seepage. |
| Mass Wasting | See "Mass movement". |
| Maximum Historical Flood | The maximum flood that has been recorded or experienced at any particular highway location. |
| Mean Annual Flood | The flood discharge with a recurrence interval of 2.33 years. |
| Mean Depth | For a stream at any stage, the wetted normal section divided by the surface width. Hydraulic mean depth. |
| Meander | In connection with streams, a winding channel usually in an erodible, alluvial valley; a reverse or S-shaped curve or series of curves formed by erosion of the concave bank, especially at the downstream end, characterized by curved flow and alternating shoals and bank erosions; meandering is a stage in the migratory movement of the channel, as a whole, down the valley. |
| Meander Scroll | Evidence of historical meander patterns in the form of lines visible on the inside of meander bends (particularly on aerial photographs) which resemble a spiral or convoluted form in ornamental design. These lines are concentric and regular forms in high sinuosity channels and are largely absent in poorly developed braided channels. |
| Microclimate | Climate of a small area, ranging from a few square centimeters to a slope or valley bottom. |
| Monoculture | Artificial plant community (sown or planted) which is composed of a single species. |
| Mulch | A natural or artificial layer of plant residue or other material that covers the land surface and conserves moisture, holds soil in place, aids in establishing vegetation, and reduces temperature fluctuations. |
| "n" Value | The roughness coefficient in the Manning formula for determination of the discharge coefficient in the Chezy formula, $V = C(RS)^{1/2}$, where $C = (1/n)R^{1/6}$ |
| Nonpoint Source Pollution | Pollution that originates from many diffuse sources. |
| Ordinary High Water Mark | The line on the shore established by the fluctuation of water and physically indicated on the bank (1.5 + years return period). |
| Overflow | Discharge of a stream outside its banks; the parallel channels carrying such discharge. |
| Peak Flow | Maximum momentary stage or discharge of a stream in flood; Design Discharge. |
| Pebble | Stone 10 to 75 mm in diameter, including coarse gravel and small cobble. |
| Perched Water | Ground water located above the level of the water table and separated from it by a zone of impermeable material. |
| Perennial | Term for plants which grow and reproduce for many years; perennial plants are usually woody. |

-continued

| | |
|---|---|
| Physiographic Region | A geographic area whose pattern of landforms differ significantly from that of adjacent regions. |
| Pioneer species | Those species which are particularly well adapted to be the first to colonize bare ground; will settle where there is meager nutrients, and prepare the area for higher successive stages. |
| Pioneer Vegetation | Starting stage of the vegetation development with first colonization; early or young stage of a naturally developed or artificially started vegetation. |
| Point of Concentration | That point at which the water flowing from a given drainage area concentrates. With reference to a highway, this would generally be either a culvert entrance or some point in a roadway drainage system. |
| Poised Stream | A term used by river engineers applying to a stream that over a period of time is neither degrading or aggrading its channel, and is nearly in equilibrium as to sediment transport and supply. |
| Practicable | Capable of being done within reasonable natural, social, and economic constraints. |
| Precipitation | Discharge of atmospheric moisture as rain, snow or hail, measured in depth of fall or in terms of intensity of fall in unit time. |
| Probability | The chance of occurrence or recurrence of a specified event within a unit of time, commonly expressed in 3 ways. Thus a 10-year flood has a chance of 0.1 per year and is also called a 10%-chance flood. |
| Probability of Exceedance | The statistical probability, expressed as a percentage, of a hydrologic event occurring or being exceeded in any given year. The probability (p) of a storm or flood is the reciprocal of the average recurrence interval (N). |
| Probable Maximum Flood | The flood discharge that may be expected from the most severe combination of critical meteorological and hydrological conditions that are reasonably possible in the region. |
| Rainfall | Point Precipitation: That which registers at a single gauge. Area Precipitation: Adjusted point rainfall for area size. |
| Rainwash | The creep of soil lubricated by rain. |
| Reach | The length of a channel uniform with respect to discharge, depth, area, and slope; more generally, any length of a river or drainage course. |
| Reinforced Earth | Strengthening of a soil fill by utilizing tensile inclusions, such as metal strips, woody fibers, wire mesh, or fabric. |
| Replacement Planting | Planting to replace planting (installed by Caltrans or others) that is damaged or removed during highway construction activity, including irrigation modification and/or replacement. Unless the environmental document or memorandum of understanding with the local agency specifies otherwise, highway planting work including replacement is done as a separate contract from the highway construction work. Exceptions may be permitted with approval of the Office of Landscape Architecture District Coordinator when justified. |
| Revegetation | Planting of indigenous plants to replace natural vegetation that is damaged or removed as a result of highway construction projects or permit requirements. This work may include provisions for irrigation. |
| Revetment | Bank protection to prevent erosion. |
| Rhizobium | The nitrogen fixing bacteria capable of living in symbiotic relationship with leguminous plants in nodules on the roots. |
| Rhizome | Stem growth which creeps beneath the soil surface; rooting at nodes to form new individuals; found in many grasses and herbs. |
| Rill | Shallow downslope erosion feature normally less than 0.3 m wide and 0.6 m deep. |
| Rill Erosion | The formation of numerous, closely spaced streamlets due to uneven detachment of surface soils by runoff on slopes. |

-continued

| | |
|---|---|
| Riparian Area | An ecosystem situated between aquatic and upland environments that is at least periodically influenced by flooding. |
| Riprap | A layer, facing, or protective mound of broken concrete, sacked concrete, rock, rubble, or stones randomly placed to prevent erosion, scour, or sloughing of a structure or embankment; also, the stone used for this purpose. |
| River | A large stream, usually active when any streams are flowing in the region. |
| Riverworks | Engineering works involving construction of or repairs to banks of streams, rivers, canals and edges of ponds, shorelines of lakes and sheltered portions of estuaries. |
| Rock | (1) Cobble, boulder or quarry stone as a construction material; (2) Hard natural mineral, in formation as in piles of talus. |
| Root Cutting | Root piece which through sprouting shoots vegetatively increases. |
| Root Hairs | Fine structures at tips of young roots, through which water and mineral salts are absorbed from soil. |
| Root-shoot Ratio | The ratio of root growth to the branches and other aerial parts of a plant. |
| Runoff | (1) The surface waters that exceed the soil's infiltration rate and depression storage; (2) The portion of precipitation that appears as flow in streams; drainage or flood discharge which leaves an area as surface flow or a pipeline flow, having reached a channel or pipeline by either surface or subsurface routes. |
| Sand | Granular soil coarser than silt and finer than gravel, ranging in diameter from 0.05 to 5 mm. |
| Sapling | Strong, young tree plant, the stem of which has normal branch development from the bottom up. |
| Scour | The result of erosive action of running water, primarily in streams, excavating and carrying away material from the bed and banks; wearing away by abrasive action. |
| Scrub | In ecology, an area dominated by shrubs, possibly as a stage in succession to high forest; in forestry, and area of unproductive woodland. |
| Sediment | Fragmentary material that originates from weathering of rocks and is transported by, suspended in, or deposited by water. |
| Sedimentation | Gravitational deposit of transported material in flowing or standing water. |
| Seed Bank | The store of dormant seed in the soil. |
| Seepage | Groundwater emerging from the face of a streambank; flow of water in the pores of soil under influence of gravity or capillary action. |
| Shallow Mass Movement | Near-surface sliding or movement of earth and/or rock masses usually along planar failure surfaces parallel to the slope face. |
| Sheet Erosion | Erosion of thin layers of soil by sheets of flowing water. |
| Sheet Flow | Any flow spread out and not confined; i.e., flow across a flat open field. |
| Shoaling | Deposition of alluvial material resulting in areas with relatively shallow depth. |
| Shrub | Woody growth whose main and side shoots form multiple branches from main stock baseline or form below-ground side shoots or on which, instead of only one stem (main stem), several stems are grown. |
| Silt | (1) Water-Borne Sediment. Detritus carried in suspension or deposited by flowing water, ranging in diameter from 0.005 to 0.05 mm. The term is generally confined to fine earth, sand, or mud, but is sometimes both suspended and bedload. (2) Deposits of Water-Borne Material. As in a reservoir, on a delta, or on floodplains. |
| Sinuosity | The ratio of the length of the river thalweg to the length of the valley proper. |
| Slope Flattening | Reduction in slope angle by excavation and regrading in order to achieve a more stable slope. |
| Slide | Gravitational movement of an unstable mass of earth from its natural position. |

-continued

| | |
|---|---|
| Slip | Rooted, trimmed stem of grass used for vegetative propagation. |
| Slipout | Gravitational movement of an unstable mass of earth from its constructed position. Applied to embankments and other man-made earthworks. |
| Slope | (1) Gradient of a stream. (2) Inclination of the face of an embankment, expressed as the ratio of horizontal to vertical projection; or (3) The face of an inclined embankment or cut slope. In hydraulics it is expressed as percent or in decimal form. |
| Soil Arching | Restraint of soil movement through an opening or gap as a result of transfer of shear stress from the deforming (or moving) soil mass to adjacent stationary (nonyielding) portions of the soil. |
| Soil Bioengineering | Use of live, woody vegetative cuttings to repair slope failures and increase slope stability; the cuttings serve as primary structural components, drains, and barriers to earth movement. |
| Species | Group of plants similar in all respects and able to interbreed. |
| Sprig Cuttings | Sprigs that can be propagated vegetatively by cutting and planting them, e.g. reed planting. |
| Spur Dike | A structure or embankment projecting a short distance into a stream from the bank and at an angle to deflect flowing water away from critical areas. |
| Stage | The elevation of a water surface above its minimum; also above or below an established "low water" plane; hence above or below any datum of reference; gage height. |
| Stem Cutting | Cuttings made from shoots; according to the nature of the wood they can be divided into hardwood, semi-softwood, softwood, and herbaceous cuttings. |
| Stem Cuttings | Usually willow or poplar one or two years old, and straight-growing; the stems measure up to 2 m long and (long stem cuttings) are cut without side branches. |
| Stolon | Stem growth which creeps over the ground surface, rooting at nodes to form new individuals; found in many grasses and herbs. |
| Stone | Rock or rock-like material; a particle of such material, in any size from pebble to the largest quarried blocks. |
| Strand | (1) To lodge on bars, banks, or overflow plain, as for drift; (2) Bar of sediment connecting two regions of higher ground. |
| Stratification | The use of chemical and mechanical systems to break dormancy and increase germination. |
| Stream | Water flowing in a channel or conduit, ranging in size from small creeks to large rivers. |
| Stream Power | An expression used in predicting bed forms and hence bed load transport in alluvial channels. It is the product of the mean velocity, the specific weight of the water-sediment mixture, the normal depth of flow and the slope. |
| Stream Response | Changes in the dynamic equilibrium of a stream by any one, or combination of various causes. |
| Stream Waters | Former surface waters which have entered and now flow in a well defined natural watercourse, together with other waters reaching the stream by direct precipitation or rising from springs in bed or banks of the watercourse. They continue as stream waters as long as they flow in the watercourse, including overflow and multiple channels as well as the ordinary or low-water channel. |
| Subcritical Flow | In this state, gravity forces are dominant, so that the flow has a low velocity and is often described as tranquil and streaming. Also, it is flow that has a Froude number less than one. |
| Substrate | The mineral and organic material that is from the bed of a stream. |
| Substrate | The layer of earth or rock immediately below the surface soil. |
| Succession | The process by which one community of plants gives way to another in a series from colonizer to climax; primary successions are naturally induced; secondary successions are those caused by human |

| | -continued |
|---|---|
| | intervention; progressive successions are all phases (series) leading to the climax stage; regressive successions are those leading away from the climax state. |
| Supercritical Flow | In this state, inertia forces are dominant, so that flow has a high velocity and is usually described as rapid, shooting and torrential. Also, it is flow which has a Froude number greater than one. |
| Surcharge | This refers to a condition where the hydraulic capacity of the storm drain system is temporarily exceeded (e.g., during a storm event), and the amount of water that enters the system exceeds the conveyance capacity. |
| Surface Runoff | The movement of water on earth's surface, whether flow is over surface of ground or in channels. |
| Temporary Construction Site BMPs | BMPs that are required only temporarily to address a short-term storm water contamination threat. For example, silt fences are located near the base of newly graded slopes that have a substantial area of exposed soil. Then, during rainfall, the silt fences filter and collect sediment from runoff flowing off the slope. |
| Terrace/berm | A level area or bench in a section of a formed or natural slope; can be several meters wide; small berms (up to 1 m wide) are also called terraces. |
| Thalweg | A longitudinal line that follows the deepest part of the channel of a stream. |
| Thread | The central element of a current, which is continuous along a stream. |
| Time of Concentration | The time required for storm runoff to flow from the most remote point, in flow time, of a drainage area to the point under consideration; it is usually associated with the design storm. |
| Toe | The break in slope at the foot of a bank where the bank meets the bed |
| Toe Zone | Portion of a streambank between the streambed and the average normal river stage |
| Top Bank | The break in slope between the bank and the surrounding terrain |
| Topsoil | Upper, rooted through, live humus surface soil layer. |
| Tractive Force | The drag or force on a streambank or bed particles caused by flowing water. |
| Transplanting | Planting of seeding in a planting bed in regular rows and intervals; according to type of plant and dimensions (height for instance) transplanting takes place more than once. |
| Transport | To carry solid material in a stream in solution, suspension, saltation, or entrainment. |
| Tributary | A river or stream that flows into a larger river or stream. |
| Turbulence | The state of flow wherein the water is agitated by cross-currents and eddies, as opposed to a condition of flow that is quiet and laminar. |
| Turbulent Flow | That type of flow in which any particle may move in any direction with respect to any other particle, and in which the head loss is approximately proportional to the square of the velocity. |
| Undermining | The removal of lateral support at the base of a slope by scour, piping erosion, or excavation. |
| Vascular System | The tissues which conduct water and nutrients from one part of a plant to another - comprising xylem and phloem. |
| Vegetation | A plant cover formed of many different plant types; the whole of the plant species of one area. |
| Vegetative Cuttings | Live, cut stems and branches of plants that will root when embedded or inserted in the ground. |
| Vegetative Measures | The use of live cuttings, seeding, sodding, and transplanting in order to establish vegetation for erosion control and slope protection work. |
| Vegetative Propagation | Reproduction by cuttings, layering and grafting; not involving fertilization. |
| Vegetated Structures | A retaining structure in which living plant materials, cuttings, or transplants have been integrated into the structure. |
| Vegetated Structural Revetments | Porous revetments, e.g., a gabion mattress or riprap, into which live plants or cuttings can be placed or inserted. |

| | -continued |
|---|---|
| Velocity | The distance that water travels in a given direction in a stream during a given interval of time. |
| Watershed | An area of land that drains into a particular river or stream, usually divided by topography. |
| Waterway | (1) That portion of a watercourse that is actually occupied by water; (2) A navigable in land body of water. |
| Woody Plants | Plants containing hard tissue made up of the remains of dead xylem cells in the stems; wood is made of mostly lignin and supports the plant and acts as a conduit for water and nutrients. |
| Xylem | Tissue in the vascular system. |

What is claimed is:

1. A method for assessing a stream environment, said method comprising:

recording site information about a stream reach within the stream environment to produce a site information record, said site information comprising an assessment name, a technician name, a stream name, a current average afternoon air temperature, a three-to-five day average afternoon air temperature, a water temperature at about sixty percent of maximum depth of said stream reach, a landscape photograph of said stream reach, an upper boundary photograph of said stream reach, and a lower boundary photograph of said stream reach, said assessment name and said photographs being automatically time/date stamped;

recording a visual assessment of the health of said stream reach by:

assigning a numerical score to, and, optionally, recording a stream health observation about each of the following stream health parameters for said stream reach, if said stream health parameter is applicable to said stream reach: a channel condition score, a hydrologic alteration score, a riparian vegetation zone score, a bank stability score, a water appearance score, a nutrient enrichment score, an instream fish cover score, an obstacles to fish movement or migration score, a pools score, an insect/invertebrate habitat score, a canopy cover score, a manure or human sewage presence score, a salinity score, a riffle embeddedness score, and a macroinvertebrates observed score, and summing said numerical scores to produce a total stream health score for said stream reach, tallying a total number of stream health parameters scored, and calculating an average stream health score for said stream reach by dividing said total stream health score by said total number of stream health parameters scored to produce a stream health record;

recording a value for each of a plurality of geomorphological characteristics for said stream reach to produce a geomorphological characteristics record, said plurality of geomorphological parameters comprising:

a dominant substrate, a plurality of bottom elevations of a characteristic cross section of said stream reach, a channel configuration of said stream reach, an observation upstream of said characteristic cross section and an observation downstream of said characteristic cross section, a flood prone width at said characteristic cross section, a water surface elevation at said characteristic cross section, a bankfull elevation at said characteristic cross section, a bankfull width at said characteristic cross section, and a derived flood plain width at said characteristic cross section, a plurality of ground elevations along said stream reach, a valley length along said stream reach, and a stream velocity within said stream reach; and recording an occurrence of one or more stream disturbances affecting stream health along said stream reach and optionally recording a stream disturbance observation about each stream disturbance occurrence to produce a stream disturbances record, said one or more stream disturbances being selected from the following list: an occurrence of vegetative clearing, an occurrence of channelization, an occurrence of streambank armoring, an occurrence of streambed disturbance, an occurrence of withdrawal of water, an occurrence of a dam, an occurrence of a levee, an occurrence of soil exposure or compaction, an occurrence of irrigation or drainage, an occurrence of contaminants, an occurrence of hard surfacing, an occurrence of overgazing, an occurrence of a road or railroad, an occurrence of a trail, an occurrence of an exotic species, an occurrence of a utility crossing, an occurrence of reduction of a floodplain, an occurrence of dredging for mineral extraction, an occurrence of land grading, an occurrence of a bridge, an occurrence of woody debris removal, and an occurrence of a piped discharged or contaminant outlet; and assembling and displaying a report that presents at least a portion of said site information record, said stream health record, said geomorphological characteristics record and/or said stream disturbances record.

2. A method for assessing a stream environment, said method comprising:

performing the method of claim 1 on a target stream;

comparing at least a portion of said records to reference records from a healthy stream to produce a comparison; and assembling and displaying a baseline stream assessment report that presents said comparison.

3. A method for assessing a stream environment, said method comprising:

performing the method of claim 1 on each stream in a watershed to produce a plurality of records;

organizing said plurality of records to produce a water resources inventory; and assembling and displaying a water resource inventorying report.

4. A method for assessing a stream environment, said method comprising:

performing the method of claim 1 on an altered stream;

comparing at least a portion of said records to a plurality of permit requirements to produce a compliance record; and assembling and displaying a permit application requirements report that presents said compliance record.

5. A method for assessing a stream environment, said method comprising:
performing the method of claim 1 on a target stream;
comparing at least a portion of said records to reference records from a healthy stream to produce a comparison;
querying a database of stream reclamation measures to determine appropriate restoration measures to be taken on said target stream; and
assembling and displaying an aquatic and riparian habitat enhancement report that presents said appropriate restoration measures.

6. A method for assessing a stream environment, said method comprising:
performing the method of claim 1 on a target stream;
querying a database of likely effects associated with each occurrence of one or more stream disturbances to determine the potential cumulative effects of each said stream disturbances on said target stream; and
assembling and displaying a cumulative effects report that presents the potential cumulative effects of said stream disturbances on said target stream.

7. A method for assessing a stream environment, said method comprising:
performing the method of claim 1 on a target stream before a treatment is implemented to produce a before treatment record;
performing the method of claim 1 on a target stream after said treatment is implemented to produce an after treatment record;
comparing at least a portion of said before treatment record to said after treatment record to produce a comparison; and
assembling and displaying a post-treatment monitoring report that presents said comparison.

8. A method for assessing a stream environment, said method comprising:
performing the method of claim 1 on a target stream at a first time to produce a first record;
performing the method of claim 1 on a target stream at a second, later time to produce a later record;
comparing at least a portion of said first record to said second treatment record to produce a comparison; and
assembling and displaying a trend-monitoring report that presents said comparison.

9. A method for assessing a stream environment, said method comprising:
performing the method of claim 1 on a target stream;
comparing at least a portion of said records to reference records from a comparable stream to produce a comparison; and
assembling and displaying a stream inventory report that presents said comparison.

10. A computer-readable medium having computer-executable instructions for performing the method of claim 1.

11. A computer-readable medium having computer-executable instructions for performing the method of claim 2.

12. A computer-readable medium having computer-executable instructions for performing the method of claim 3.

13. A computer-readable medium having computer-executable instructions for performing the method of claim 4.

14. A computer-readable medium having computer-executable instructions for performing the method of claim 5.

15. A computer-readable medium having computer-executable instructions for performing the method of claim 6.

16. A computer-readable medium having computer-executable instructions for performing the method of claim 7.

17. A computer-readable medium having computer-executable instructions for performing the method of claim 8.

18. A computer-readable medium having computer-executable instructions for performing the method of claim 9.

19. A system for assessing a stream environment, said system comprising:
means for recording site information about a stream reach within the stream environment to produce a site information record;
means for recording a visual assessment of the health of said stream reach by:
assigning a numerical score to, and, optionally, recording a stream health observation about each of the following stream health parameters for said stream reach, if said stream health parameter is applicable to said stream reach: a channel condition score, a hydrologic alteration score, a riparian vegetation zone score, a bank stability score, a water appearance score, a nutrient enrichment score, an instream fish cover score, an obstacles to fish movement or migration score, a pools score, an insect/invertebrate habitat score, a canopy cover score, a manure or human sewage presence score, a salinity score, a riffle embeddedness score, and a macroinvertebrates observed score, and
summing said numerical scores to produce a total stream health score for said stream reach, tallying a total number of stream health parameters scored, and calculating an average stream health score for said stream reach by dividing said total stream health score by said total number of stream health parameters scored to produce a stream health record;
means for recording a value for each of a plurality of geomorphological characteristics for said stream reach to produce a geomorphological characteristics record, said plurality of geomorphological parameters comprising:
a dominant substrate, a plurality of bottom elevations of a characteristic cross section of said stream reach, a channel configuration of said stream reach, an observation upstream of said characteristic cross section and an observation downstream of said characteristic cross section, a flood prone width at said characteristic cross section, a water surface elevation at said characteristic cross section, a bankfull elevation at said characteristic cross section, a bankfull width at said characteristic cross section, and a derived flood plain width at said characteristic cross section, a plurality of ground elevations along said stream reach, a valley length along said stream reach, and a stream velocity within said stream reach; and
means for recording an occurrence of one or more stream disturbances affecting stream health along said stream reach and optionally recording a stream disturbance observation about each stream disturbance occurrence to produce a stream disturbances record, said one or more stream disturbances being selected from the following list: an occurrence of vegetative clearing, an occurrence of channelization, an occurrence of streambank armoring, an occurrence of streambed disturbance, an occurrence of withdrawal of water, an occurrence of a dam, an occurrence of a levee, an occurrence of soil exposure or compaction, an occurrence of irrigation or drainage, an occurrence of contaminants, an occurrence of hard surfacing, an occurrence of overgazing, an occurrence of a road or railroad, an occurrence of a trail, an occurrence of an exotic species, an occurrence of a utility crossing, an occurrence of reduction of a floodplain, an occurrence of dredging for mineral extraction, an occurrence of land grading, an occurrence of a bridge, an occurrence of woody debris removal, and an occurrence of a piped discharged or contaminant outlet; and means for assembling and displaying a report that presents at least a portion of said site information record, said stream health record, said geomorphological characteristics record and/or said stream disturbances record.

20. A system for assessing a stream environment, said system comprising:
a storage device;
a printer; and
a processor programmed to:
maintain in a site information record in said storage device information about a stream reach within the stream environment;
maintain in a stream health record in said storage device a visual assessment of the health of said stream reach comprising:
a numerical score characterizing, and, optionally, a stream health observation about each of the following stream health parameters for said stream reach, if said stream health parameter is applicable to said stream reach: a channel condition score, a hydrologic alteration score, a riparian vegetation zone score, a bank stability score, a water appearance score, a nutrient enrichment score, an instream fish cover score, an obstacles to fish movement or migration score, a pools score, an insect/invertebrate habitat score, a canopy cover score, a manure or human sewage presence score, a salinity score, a riffle embeddedness score, and a macroinvertebrates observed score, and
a calculated total stream health score for said stream reach, a calculated total number of stream health parameters scored, and an average stream health score for said stream reach calculated by dividing said total stream health score by said total number of stream health parameters scored;
maintain in a geomorphological characteristics record in said storage device a value for each of a plurality of geomorphological characteristics for said stream reach, said plurality of geomorphological parameters comprising:
a dominant substrate, a plurality of bottom elevations of a characteristic cross section of said stream reach, a channel configuration of said stream reach, an observation upstream of said characteristic cross section and an observation downstream of said characteristic cross section, a flood prone width at said characteristic cross section, a water surface elevation at said characteristic cross section, a bankfull elevation at said characteristic cross section, a bankfull width at said characteristic cross section, and a derived flood plain width at said characteristic cross section, a plurality of ground elevations along said stream reach, a valley length along said stream reach, and a stream velocity within said stream reach; and maintain in a stream disturbances record in said storage device an indication of occurrence of one or more stream disturbances affecting stream health along said stream reach, said one or more stream disturbances being selected from the following list, and optionally, a stream disturbance observation about each stream disturbance occurrence: an occurrence of vegetative clearing, an occurrence of channelization, an occurrence of streambank armoring, an occurrence of streambed disturbance, an occurrence of withdrawal of water, an occurrence of a dam, an occurrence of a levee, an occurrence of soil exposure or compaction, an occurrence of irrigation or drainage, an occurrence of contaminants, an occurrence of hard surfacing, an occurrence of overgazing, an occurrence of a road or railroad, an occurrence of a trail, an occurrence of an exotic species, an occurrence of a utility crossing, an occurrence of reduction of a floodplain, an occurrence of dredging for mineral extraction, an occurrence of land grading, an occurrence of a bridge, an occurrence of woody debris removal, and an occurrence of a piped discharged or contaminant outlet; and assemble and print on said printer a report that presents at least a portion of said site information record, said stream health record, said geomorphological characteristics record and/or said stream disturbances record.

21. The system of claim 20 wherein said instream fish cover score varies from 1 to 10 and an assigned instream cover score of 8 is associated with 6 to 7 types of cover being available.

22. The system of claim 20 wherein said obstacles to fish movement or migration score varies from 1 to 10 and an assigned obstacles to fish movement or migration score of 7 is associated with water withdrawn seasonally prohibiting fish movement.

23. The system of claim 20 wherein each stream health observation, each observation upstream of said characteristic cross section, each observation downstream of said characteristic cross section and each stream disturbance observation comprises: a date/time stamp, a position and a field note and/or a digital image.

24. The system of claim 20 wherein said processor is also programmed to:
process said plurality of bottom elevations of said characteristic cross section of said stream reach to produce a graph of said characteristic cross section and present said characteristic cross section in said report.

* * * * *